US012475424B1

(12) United States Patent
Contreras et al.

(10) Patent No.: US 12,475,424 B1
(45) Date of Patent: Nov. 18, 2025

(54) HYBRID MODELING SYSTEM FOR OILFIELD PERFORMANCE OPTIMIZATION

(71) Applicant: Enovate AI Corporation, The Woodlands, TX (US)

(72) Inventors: Jose Contreras, Houston, TX (US); Meisong Yan, Houston, TX (US); Rebecca Nye, London (GB); Daniel Martinez, Bogota (CO); Camilo Mejia, Houston, TX (US)

(73) Assignee: Enovate AI Corporation, The Woodlands, TX (US)

( * ) Notice: Subject to any disclaimer, the term of this patent is extended or adjusted under 35 U.S.C. 154(b) by 0 days.

(21) Appl. No.: 18/816,248

(22) Filed: Aug. 27, 2024

(51) Int. Cl.
*G06Q 10/0639* (2023.01)
*G01N 33/28* (2006.01)
*G06N 20/00* (2019.01)
*G06Q 50/02* (2024.01)

(52) U.S. Cl.
CPC ..... *G06Q 10/0639* (2013.01); *G01N 33/2841* (2013.01); *G01N 33/2847* (2013.01); *G06N 20/00* (2019.01); *G06Q 50/02* (2013.01)

(58) Field of Classification Search
CPC .............. G06Q 10/0639; G06Q 50/02; G01N 33/2841; G01N 33/2847; G06N 20/00
See application file for complete search history.

(56) References Cited

U.S. PATENT DOCUMENTS

| | | | | |
|---|---|---|---|---|
| 7,980,312 | B1 * | 7/2011 | Hill | E21B 43/241 166/272.2 |
| 11,506,052 | B1 * | 11/2022 | Toronyi | G06Q 10/06393 |
| 2012/0130696 | A1 * | 5/2012 | Davidson | G06Q 10/06375 703/10 |
| 2013/0035919 | A1 * | 2/2013 | Al-Shammari | G06F 30/20 703/10 |
| 2014/0172382 | A1 * | 6/2014 | Andrews | F17D 5/00 703/2 |
| 2018/0347326 | A1 * | 12/2018 | Shammari | E21B 49/087 |
| 2020/0080407 | A1 * | 3/2020 | Gunnerud | G05B 13/048 |
| 2021/0198985 | A1 * | 7/2021 | Tonkin | E21B 43/00 |
| 2021/0222552 | A1 * | 7/2021 | Gao | E21B 49/02 |
| 2023/0313807 | A1 * | 10/2023 | Malki | F04D 15/0088 417/44.1 |

OTHER PUBLICATIONS

International Search Report and Written Opinion for International Application No. PCT/US2025/043482, mailed Oct. 14, 2025, 07 Pages.

* cited by examiner

*Primary Examiner* — Shelby A Turner
*Assistant Examiner* — Yaritza H Perez Bermudez
(74) *Attorney, Agent, or Firm* — DLA PIPER LLP (US)

(57) ABSTRACT

A system for enhancing oilfield performance analysis and optimization, comprising a data collection module configured to collect real-time Gas-Oil Ratio (GOR) and Water Cut (WC) data from oilfield sensors a physics-based modeling module configured to simulate a vertical pressure profile based on the collected GOR and WC data, and a machine learning module configured to analyze outputs from the physics-based modeling module and historical data, classify wells based on the analysis, establish baseline metrics for evaluating reservoir productivity based on the analysis and classification, generate a recommendation for well operations based on the analysis, classification and baseline metrics, and a user interface configured to display the recommendation.

20 Claims, 10 Drawing Sheets

HYBRID MODELING SYSTEM FOR OILFIELD PERFORMANCE OPTIMIZATION

FIELD

The present disclosure generally relates to a hybrid modeling system for oilfield performance optimization. In one example, the system combines physics-based modeling with machine learning techniques to analyze and optimize oilfield operations, providing comprehensive insights for improved decision-making and enhanced production efficiency.

BACKGROUND

In the oil and gas industry, maximizing production efficiency while minimizing costs is critical for long-term sustainable development. Traditional methods of performance benchmarking and well performance optimization often rely on manual analysis of production data, including Gas-Oil Ratio (GOR) and Water Cut (WC) measurements. These approaches typically involve periodic reviews of historical data, basic statistical analysis, and the application of simplified physical models to estimate well performance and guide operational decisions.

However, these conventional methods often lack the sophistication necessary to capture subtle patterns in reservoir behavior and struggle to provide real-time insights for proactive decision-making. The reliance on manual analysis can lead to delays in identifying and addressing performance issues, potentially resulting in reduced production efficiency and increased operational costs. Additionally, the complexity of modern oilfield operations, with numerous interrelated variables affecting well performance, makes it challenging for traditional approaches to accurately model and predict system behavior across diverse well conditions and production scenarios.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one aspect, the present disclosure relates to a system for enhancing oilfield performance analysis and optimization, comprising a data collection module configured to collect real-time Gas-Oil Ratio (GOR) and Water Cut (WC) data from oilfield sensors, a physics-based modeling module configured to simulate a vertical pressure profile based on the collected GOR and WC data, a machine learning module configured to analyze outputs from the physics-based modeling module and historical data, classify wells based on the analysis, establish baseline metrics for evaluating reservoir productivity based on the analysis and classification, generate a recommendation for well operations based on the analysis, classification and baseline metrics, and a user interface configured to display the recommendation.

In embodiments of this aspect, the disclosure according to any one of the above example embodiments, the physics-based modeling module is configured to simulate the vertical pressure profile by applying fluid dynamics and thermodynamics principles to the collected GOR and WC data.

In embodiments of this aspect, the disclosure according to any one of the above example embodiments, the machine learning module comprises supervised learning algorithms for performance prediction and unsupervised learning algorithms for well classification and pattern recognition.

In embodiments of this aspect, the disclosure according to any one of the above example embodiments, further comprising an alarm generation module configured to detect anomalies in real-time GOR and WC data and generate alerts when deviations from expected behavior occur.

In embodiments of this aspect, the disclosure according to any one of the above example embodiments, the alarm generation module is configured to generate different levels of alarms based on the severity of detected anomalies.

In embodiments of this aspect, the disclosure according to any one of the above example embodiments, the machine learning module is further configured to generate the recommendation for gas allocation optimization based on predicted post-lifting production for each well.

In embodiments of this aspect, the disclosure according to any one of the above example embodiments, further comprising a continuous improvement module configured to update the physics-based modeling module and the machine learning module with new performance data collected after implementing the recommendation for well operations.

In embodiments of this aspect, the disclosure according to any one of the above example embodiments, the continuous improvement module is further configured to refine predictions and optimization strategies based on the updated physics-based modeling module and machine learning module.

In embodiments of this aspect, the disclosure according to any one of the above example embodiments, the user interface is configured to display data visualization dashboards comprising histograms, scatter plots, and statistical summaries of well performance metrics.

In embodiments of this aspect, the disclosure according to any one of the above example embodiments, the data visualization dashboards include cross-plots of oil rate versus gas-oil ratio and oil rate versus depth.

In one aspect, the present disclosure relates to a method for enhancing oilfield performance analysis and optimization, comprising collecting real-time Gas-Oil Ratio (GOR) and Water Cut (WC) data from oilfield sensors, simulating a vertical pressure profile based on the collected GOR and WC data using a physics-based modeling module, analyzing outputs from the physics-based modeling module and historical data using a machine learning module, classifying wells based on the analysis, establishing baseline metrics for evaluating reservoir productivity based on the analysis and classification, generating a recommendation for well operations based on the analysis, classification and baseline metrics, and displaying the recommendation on a user interface.

In embodiments of this aspect, the disclosure according to any one of the above example embodiments, simulating a vertical pressure profile comprises applying fluid dynamics and thermodynamics principles to the collected GOR and WC data.

In embodiments of this aspect, the disclosure according to any one of the above example embodiments, the machine learning module comprises supervised learning algorithms for performance prediction and unsupervised learning algorithms for well classification and pattern recognition.

In embodiments of this aspect, the disclosure according to any one of the above example embodiments, further comprising detecting anomalies in real-time GOR and WC data and generating alerts when deviations from expected behavior occur.

In embodiments of this aspect, the disclosure according to any one of the above example embodiments, further comprising generating different levels of alarms based on the severity of detected anomalies.

In embodiments of this aspect, the disclosure according to any one of the above example embodiments, further comprising generating the recommendation for gas allocation optimization based on predicted post-lifting production for each well.

In embodiments of this aspect, the disclosure according to any one of the above example embodiments, further comprising updating the physics-based modeling module and the machine learning module with new performance data collected after implementing the recommendation for well operations.

In embodiments of this aspect, the disclosure according to any one of the above example embodiments, further comprising refining predictions and optimization strategies based on the updated physics-based modeling module and machine learning module.

In embodiments of this aspect, the disclosure according to any one of the above example embodiments, further comprising displaying data visualization dashboards comprising histograms, scatter plots, and statistical summaries of well performance metrics.

In embodiments of this aspect, the disclosure according to any one of the above example embodiments, the data visualization dashboards include cross-plots of oil rate versus gas-oil ratio and oil rate versus depth.

The foregoing general description of the illustrative embodiments and the following detailed description thereof are merely exemplary aspects of the teachings of this disclosure and are not restrictive.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
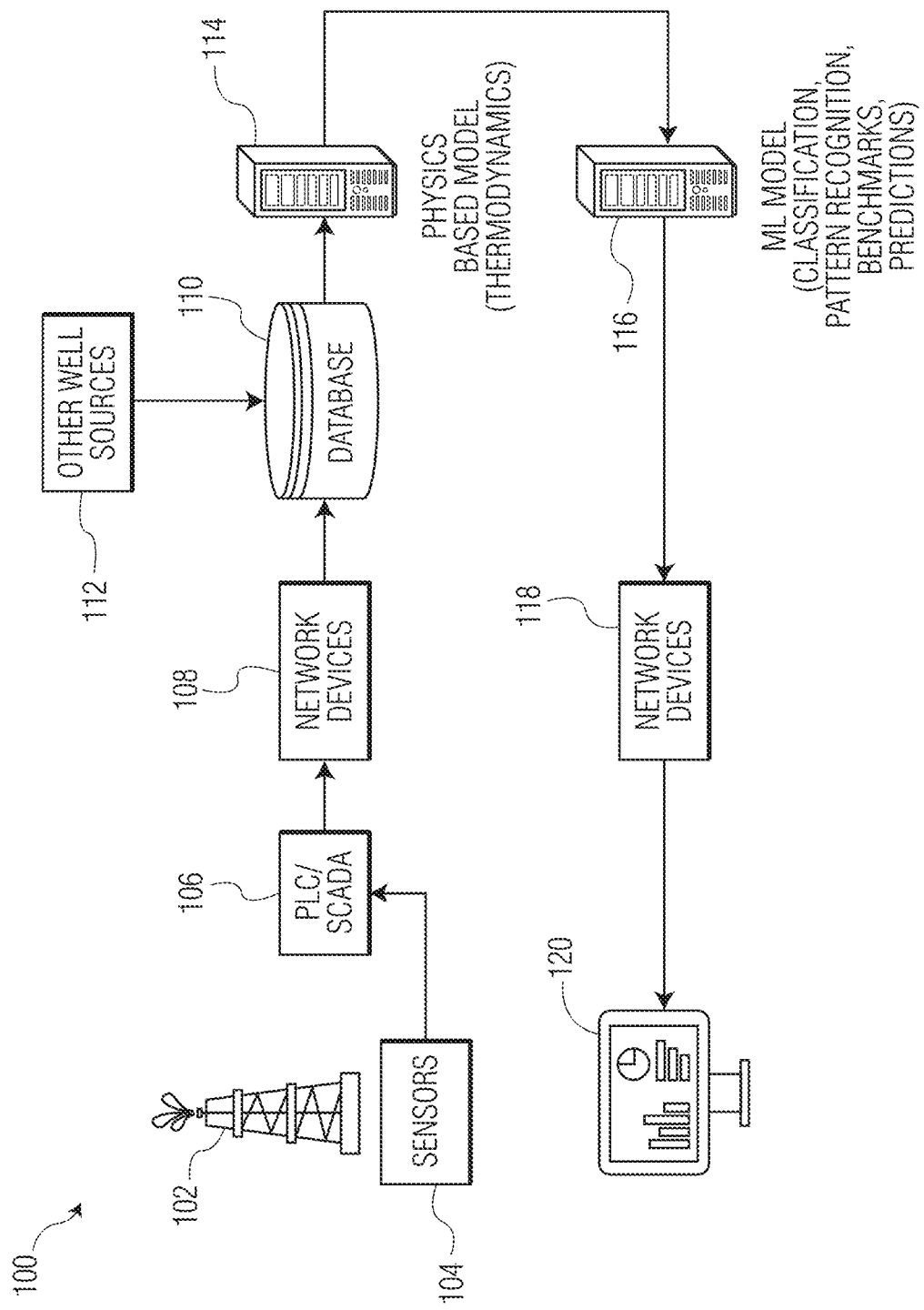
FIG. 1 illustrates a block diagram of a system for enhancing oilfield performance analysis and optimization, according to aspects of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The present disclosure provides a system and method for enhancing oilfield performance analysis and optimization. This system many integrate physics-based modeling and machine learning techniques to analyze real-time Gas-Oil Ratio (GOR) and Water Cut (WC) data collected from oilfield sensors. The physics-based modeling module may simulate a vertical pressure profile based on the collected GOR and WC data, providing a theoretically grounded baseline for well behavior. The machine learning module may then analyze the outputs from the physics-based modeling module along with historical data, enabling the system to capture complex, non-linear relationships and subtle patterns in well performance. This hybrid approach allows for more accurate and comprehensive insights, facilitating improved operational decision-making and efficiency. The system may include an alarm generation module for real-time anomaly detection and a continuous improvement module for ongoing optimization based on new performance data. The insights and recommendations generated by the system are displayed on a user interface, providing operators with actionable information for proactive reservoir management.

Referring to FIG. 1, a block diagram illustrates a system 100 for enhancing oilfield performance analysis and optimization. The system 100 may include an oil derrick 102 equipped with a sensor array 104 for collecting real-time GOR and WC data. The sensor array 104 may be connected to a PLC SCADA system 106, which processes and transmits the collected data through network devices 108 to a data storage 110. The data storage 110 may also receive input from other data sources 112, such as historical records or additional sensor data, providing a comprehensive dataset for analysis.

The stored data may then be processed by a physics-based modeling server 114, which applies principles of fluid dynamics, thermodynamics, and reservoir engineering to simulate vertical pressure profiles and predict well performance under various GOR and WC scenarios. The output from the physics-based modeling server 114, along with the original input data and historical production records, may then be fed into a machine learning model server 116.

The machine learning model server 116 employs both supervised and unsupervised learning techniques to perform several functions. These functions may include classifying wells with similar characteristics into groups, identifying patterns in well performance, establishing performance benchmarks based on the combined physics-based and historical data, and fine-tuning predictions to capture subtle relationships or factors not accounted for in the physics-based models.

In some aspects, the physics-based modeling module and the machine learning module may operate in parallel to enhance the efficiency and comprehensiveness of the analysis. While these modules can function concurrently, the physics-based modeling module specifically serves as an input for the clustering analysis performed by the machine learning module. This arrangement allows the machine learning module to utilize the detailed simulations of vertical pressure profiles generated by the physics-based modeling module, enriching the data set with theoretically grounded insights before applying clustering algorithms. This integration ensures that the classification of wells is not only based on historical data patterns but is also deeply informed by current, physics-based simulations, leading to more robust and accurate well classifications.

The results from the machine learning model server 116 may then be transmitted through network devices 118 to a user interface dashboard 120. The user interface dashboard 120 presents the analyzed data and insights in a visual format, allowing users to interpret the results and make informed decisions about oilfield operations. In some cases, the user interface dashboard 120 may also display real-time monitoring data and alerts generated by the system 100, facilitating proactive intervention and reduced downtime.

In some aspects, the PLC SCADA system 106 may be configured to process data from a variety of sensor types, including pressure sensors, temperature sensors, flow meters, and other relevant sensors installed at the oil derrick 102. The network devices 118 may include routers, switches, or other networking equipment capable of transmitting data over wired or wireless connections. The data storage 110 may be a local or remote server, a cloud-based storage system, or any other suitable data storage solution. The user interface dashboard 120 may be a web-based interface, a standalone software application, or a mobile app, and may provide various data visualization tools such as charts, graphs, and tables to aid in data interpretation.

In a specific use case for the system illustrated in FIG. 1, an oil company may be operating a mature oilfield with multiple wells experiencing declining production rates. The company aims to optimize its gas allocation strategy to maximize oil production across the field while minimizing operational costs.

The sensor array 104 installed on each oil derrick 102 may continuously collect real-time GOR and WC data from active wells. This data is transmitted through the PLC SCADA system 106 and network devices 118 to the data storage 110. Historical production data and geological information from other data sources 112 are also integrated into the data storage 110, providing a comprehensive dataset for analysis.

The physics-based modeling server 114 may process this data, simulating vertical pressure profiles for each well based on their current GOR and WC values. These simulations provide insights into the fluid dynamics within each well, helping to identify potential flow issues or pressure anomalies. Concurrently, the machine learning model server 116 analyzes the physics-based model outputs along with historical data to classify wells into groups based on their performance characteristics and to predict future production trends.

Based on this analysis, the system may generate recommendations for optimizing gas allocation across the field. For instance, it may suggest reducing gas injection in wells with high water cut and increasing it in wells with favorable GOR values and production potential. These recommendations are displayed on the user interface dashboard 120, allowing field operators to make informed decisions about gas allocation adjustments.

As these changes are implemented, the system may continue to monitor well performance in real-time. The alarm generation module may detect any anomalies, such as sudden changes in GOR or WC, and alert operators through the user interface dashboard 120. This enables quick responses to potential issues, minimizing downtime and maintaining improved (e.g. optimal) production levels across the oilfield.

In some aspects, the system may be configured to autonomously control various aspects of oilfield operations based on the insights and recommendations generated by the physics-based modeling and machine learning modules. This autonomous control capability may include adjusting gas allocation, modifying well production rates, initiating maintenance procedures, or implementing other operational changes without direct human intervention. The system may utilize predefined decision-making algorithms and thresholds to determine when and how to implement these autonomous actions, while still providing operators with the ability to override or adjust the system's decisions through the user interface dashboard. This autonomous control feature may further enhance operational efficiency, reduce response times to changing conditions, and optimize overall oilfield performance.

Figure 2:
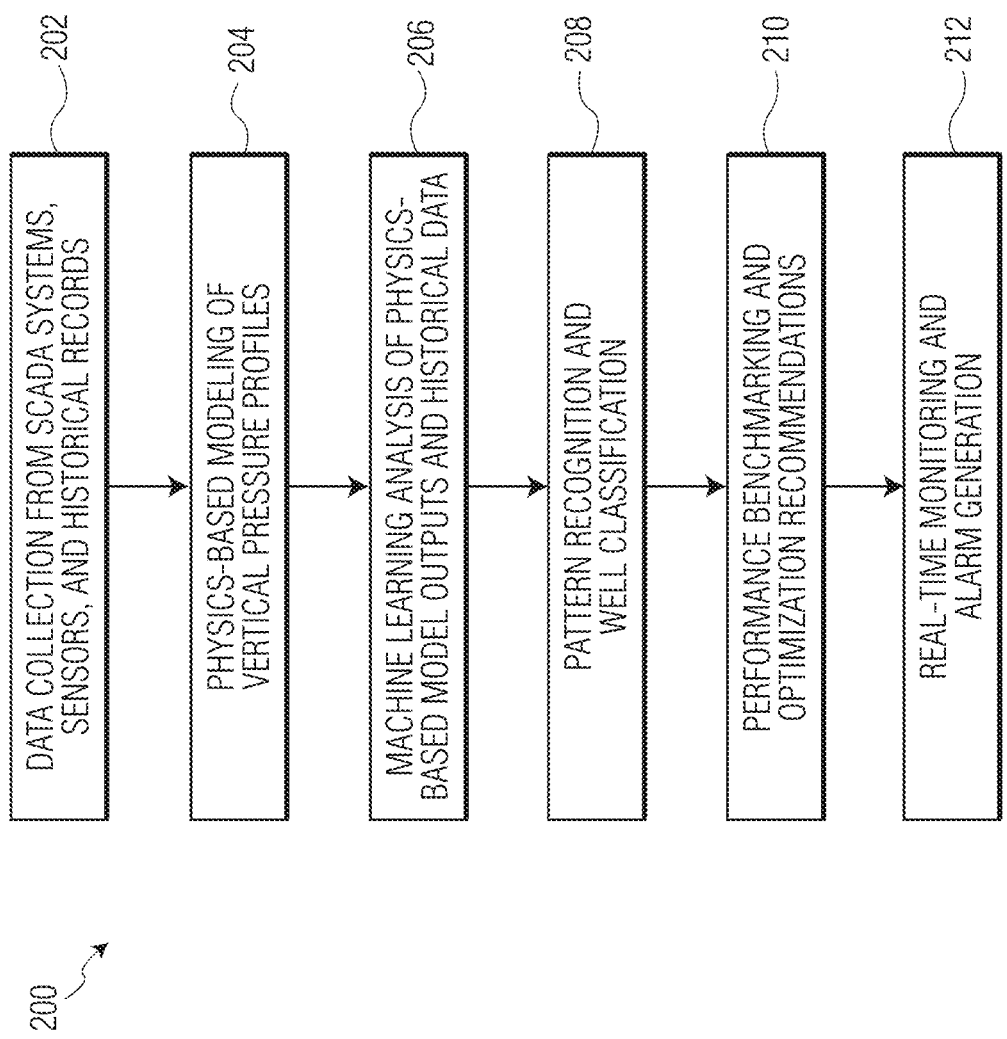
FIG. 2 illustrates a flowchart of a process for enhancing oilfield performance analysis and optimization, according to an embodiment.
Figure 3:
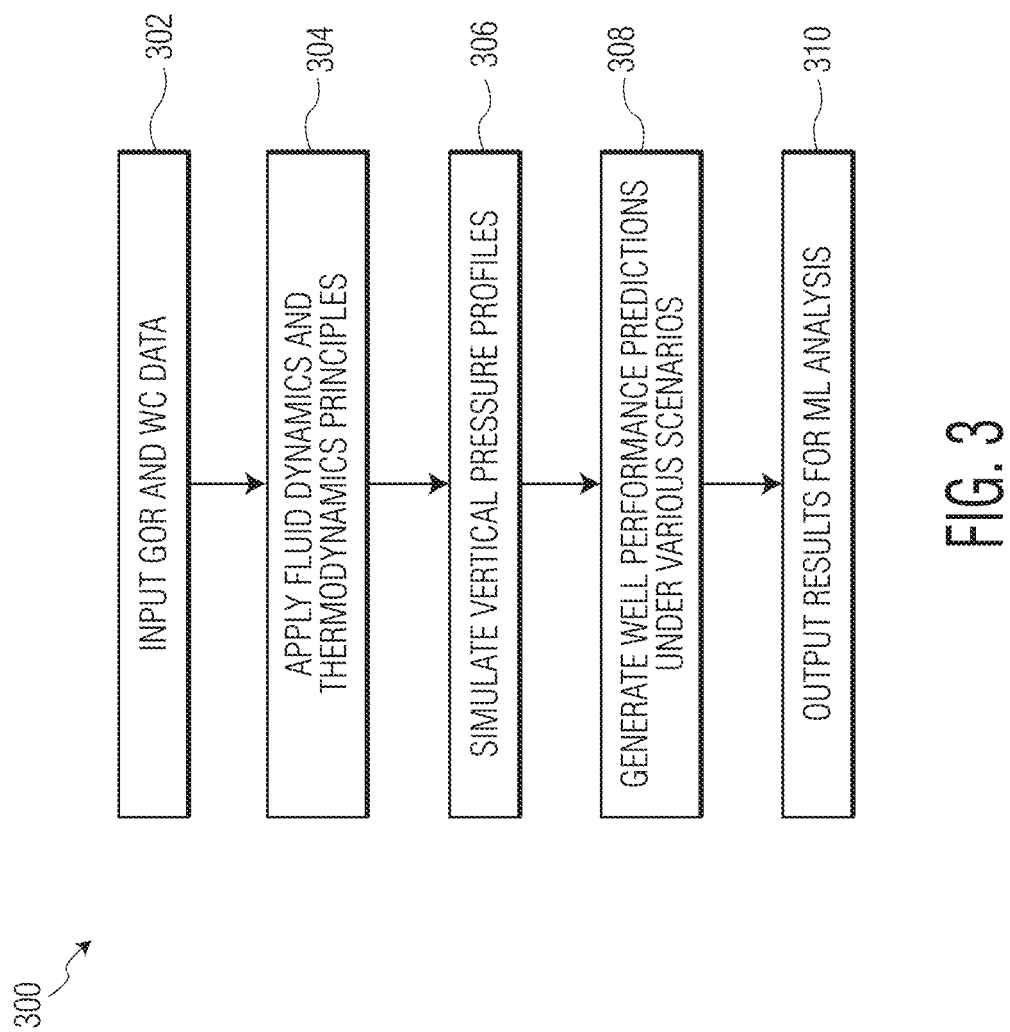
FIG. 3 illustrates a flowchart for a physics-based modeling process, in accordance with example embodiments.
Figure 4:
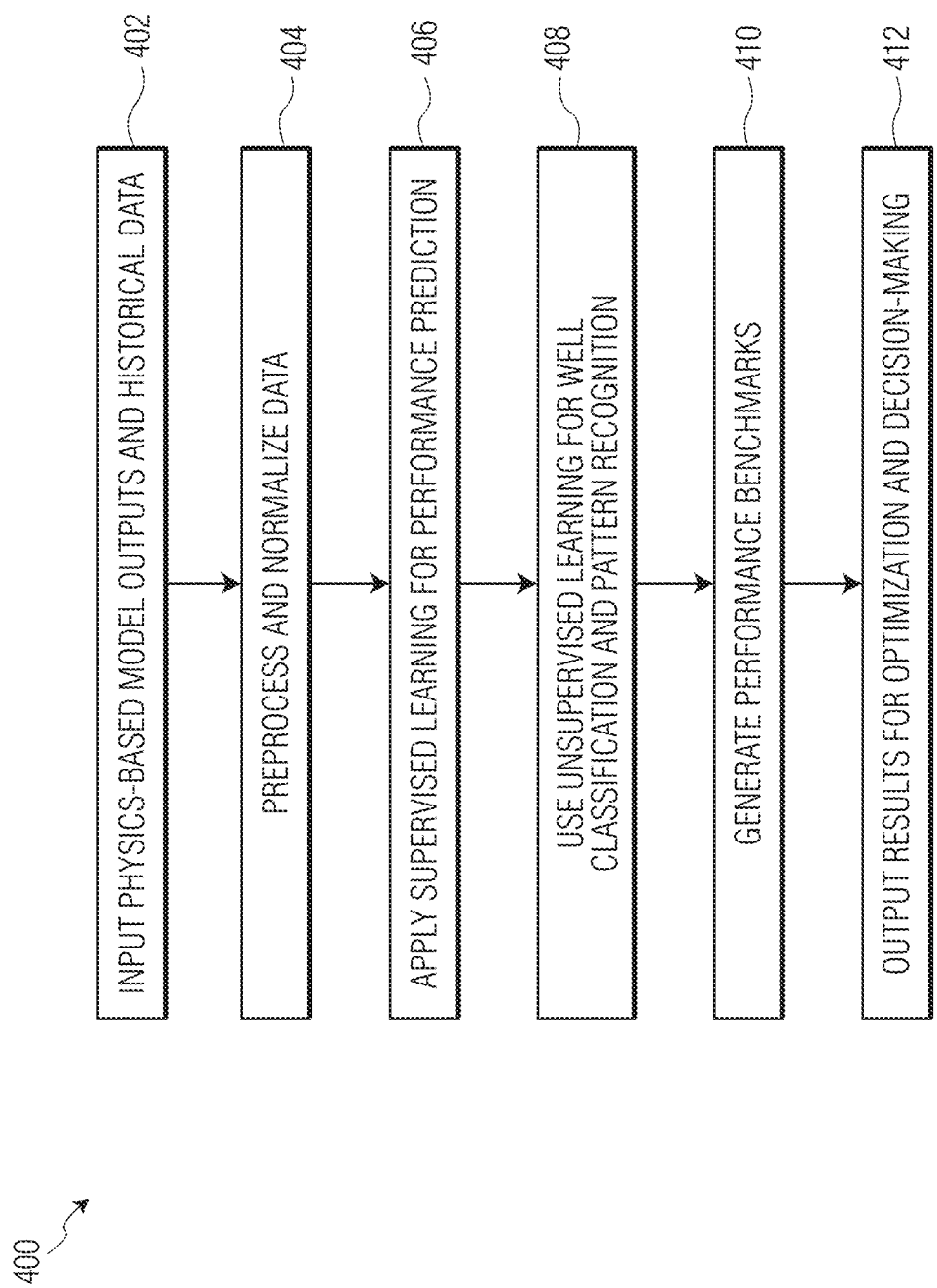
FIG. 4 illustrates a flowchart for a machine learning analysis workflow process, according to aspects of the present disclosure.
Figure 5:
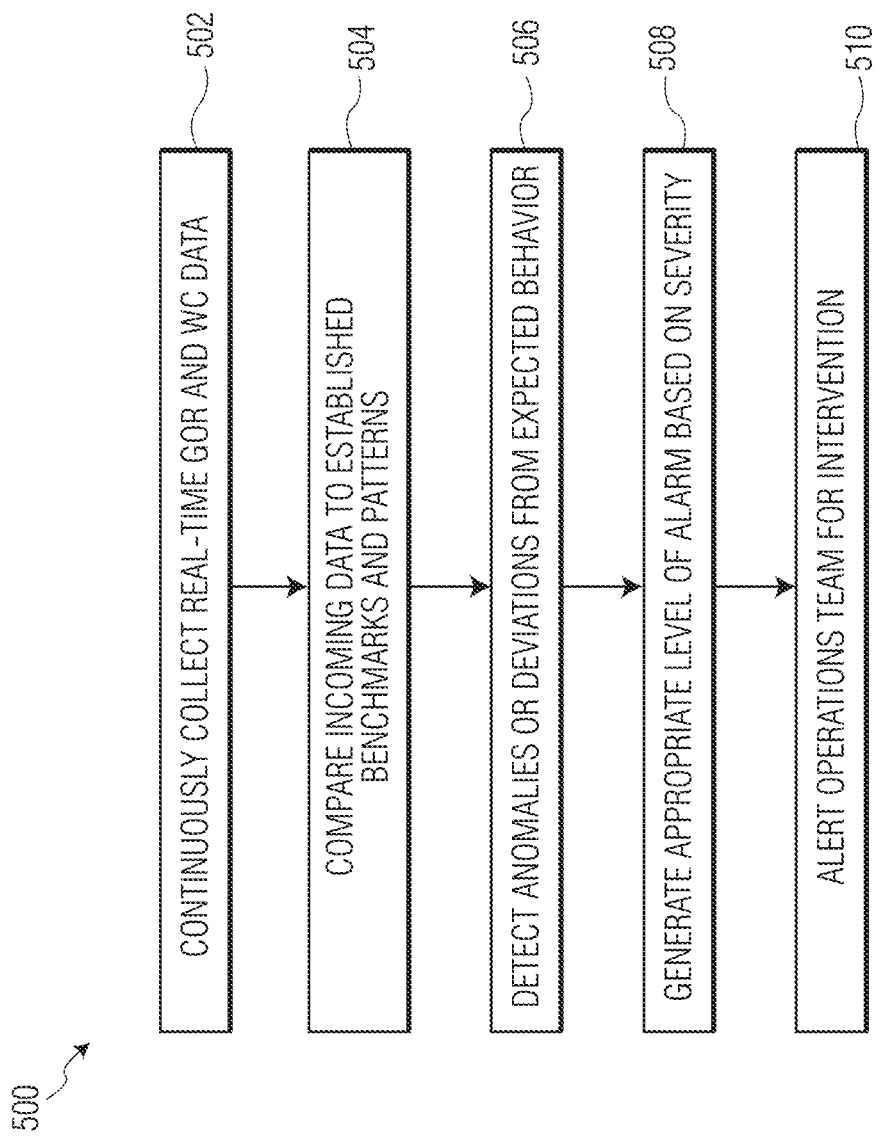
FIG. 5 illustrates a flowchart for a real-time monitoring and alarm generation process, according to an embodiment.
Figure 6:
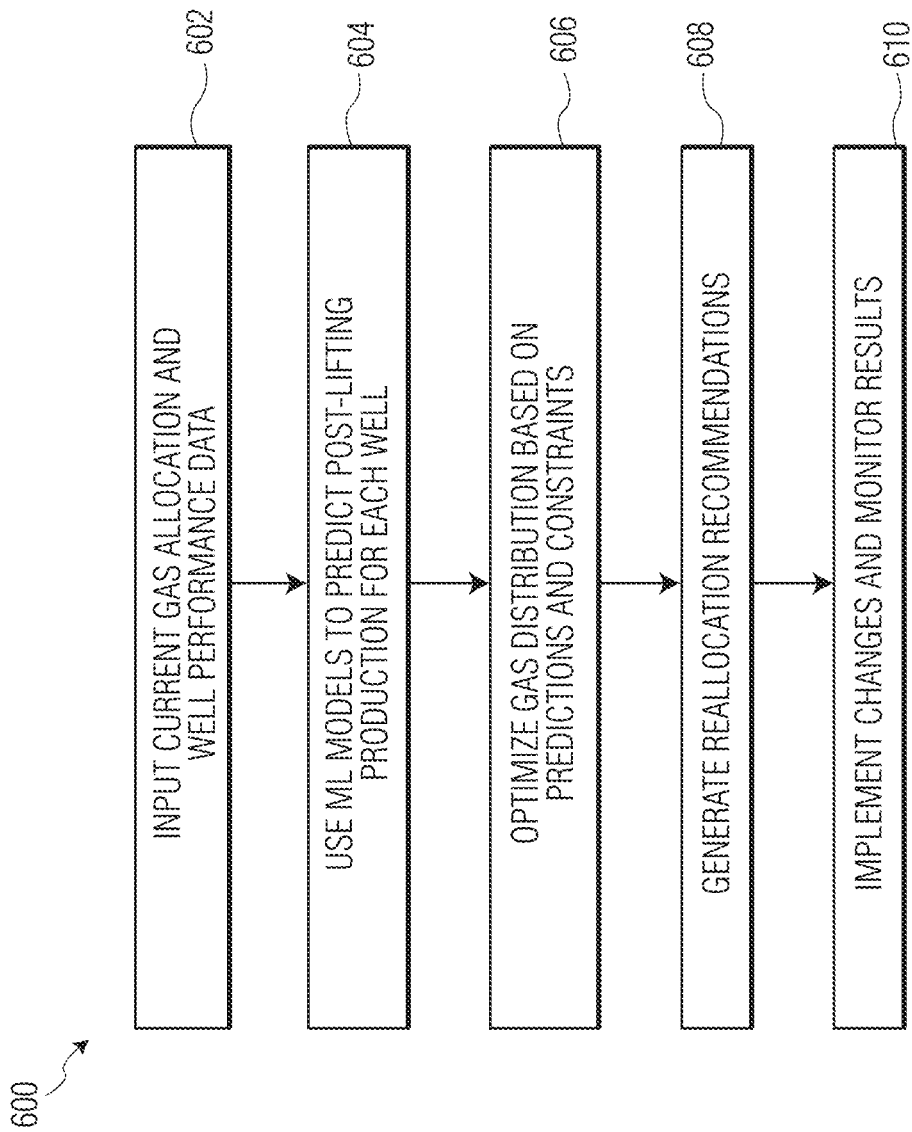
FIG. 6 illustrates a flowchart for a gas allocation optimization process, in accordance with example embodiments.
Figure 7:
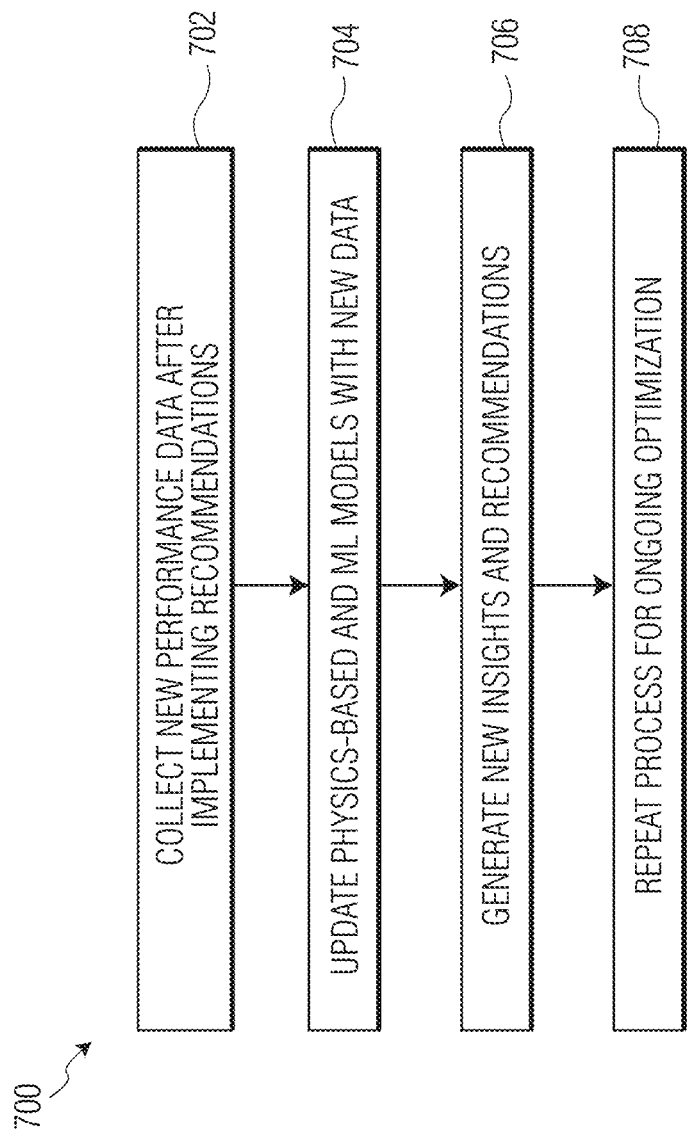
FIG. 7 illustrates a flowchart for a continuous improvement process for oilfield performance optimization, according to aspects of the present disclosure.

The solution presented in this disclosure is comprehensively detailed through the flowcharts illustrated in FIGS. 2-7, providing an in-depth overview of the various processes involved in enhancing oilfield performance analysis and optimization. FIG. 2 illustrates the overall process flow, encompassing data collection, modeling, analysis, and monitoring, while FIG. 3 delves into the physics-based modeling process, demonstrating how vertical pressure profiles are simulated using collected data. The machine learning analysis workflow is outlined in FIG. 4, which includes data preprocessing, supervised and unsupervised learning techniques, and output generation. FIG. 5 showcases the real-time monitoring and alarm generation process, illustrating how anomalies are detected and alerts are triggered. The gas allocation optimization process is the focus of FIG. 6, which demonstrates how machine learning predictions are utilized to optimize gas distribution and generate recommendations. FIG. 7 highlights the continuous improvement process, showing how new data is incorporated to refine models and generate updated insights.

Each flowchart outlines the specific steps and components of its respective process, offering a representation of how the system may operate to achieve improved oilfield performance and decision-making.

It should be noted that the steps and processes illustrated in the flowcharts may be modified, reordered, or adapted based on specific operational requirements or data characteristics. The flowcharts represent example implementations, and variations may be made to optimize the system for different oilfield environments or operational needs.

Referring to FIG. 2, a flowchart illustrates a process 200 for enhancing oilfield performance analysis and optimization. The process 200 begins with step 202, which involves data collection from SCADA systems, sensors, and historical records. This step may involve collecting real-time GOR and WC data from oilfield sensors, such as pressure sensors, temperature sensors, flow meters, and other relevant sensors installed at the oil derrick 102. The collected data may include various parameters related to oilfield operations, such as pressure, temperature, flow rate, and other relevant measurements. In some cases, the data collection may also include historical data from previous operations, which can provide context and baseline information for the subsequent analysis. The data collection may be facilitated by a data collection module, which may be configured to interface with various data sources and collect the data in a suitable format for further processing.

Step 204 may involve physics-based modeling of vertical pressure profiles using the collected data. In this step, the physics-based modeling module may apply principles of fluid dynamics, thermodynamics, and reservoir engineering to simulate vertical pressure profiles for each well. The module may use the collected GOR and WC data, along with other relevant parameters, to create detailed models of fluid behavior within the wellbore. These models may account for factors such as fluid composition, temperature gradients, and pressure changes along the well depth. The simulated pressure profiles provide a theoretically grounded baseline for understanding well behavior under various conditions.

In some aspects, the physics-based modeling module may incorporate advanced numerical methods and computational fluid dynamics (CFD) techniques to enhance the accuracy and resolution of the simulated vertical pressure profiles. These advanced modeling approaches may allow for the consideration of complex well geometries, multiphase flow regimes, and transient phenomena that can significantly impact well performance. The module may also integrate geomechanical models to account for formation stress changes and their effects on fluid flow within the reservoir and wellbore. By incorporating these sophisticated modeling techniques, the system may provide more detailed and realistic simulations of well behavior, enabling operators to make more informed decisions about production strategies and well interventions.

Step 206 may involve machine learning analysis of the physics-based model outputs and historical data. In this step, the machine learning module may employ various algorithms to analyze the simulated pressure profiles generated by the physics-based modeling module, along with historical production data and other relevant information. The machine learning analysis may involve both supervised and unsupervised learning techniques to identify patterns, correlations, and trends in the data that may not be immediately apparent from the physics-based models alone.

In some aspects, the machine learning module may utilize techniques such as deep learning neural networks, ensemble methods, or reinforcement learning algorithms to enhance its analytical capabilities. These sophisticated approaches may enable the module to capture complex, non-linear relationships within the data and adapt to changing conditions in real-time. The module may also incorporate feature engineering techniques to create new, meaningful variables from the raw data, potentially uncovering hidden insights that may significantly impact well performance predictions. Additionally, the machine learning module may employ transfer learning methods, allowing it to leverage knowledge gained from analyzing one set of wells to improve predictions for wells with limited historical data, thereby enhancing the system's ability to optimize performance across diverse oilfield environments.

Step 208 focuses on pattern recognition and well classification based on the analysis results. Using the insights gained from the machine learning analysis, the system may identify common characteristics among wells and group them into categories. This classification may be based on factors such as production rates, GOR and WC trends, pressure profiles, and other relevant parameters. The classification process may help operators identify wells with similar behavior or performance issues, facilitating more targeted optimization strategies.

In some aspects, the well classification process may incorporate dynamic clustering algorithms that can adapt to changing well conditions over time. These algorithms may continuously update the well categories based on new data, allowing for real-time adjustments to the classification scheme. The system may also employ multi-dimensional scaling techniques to visualize the relationships between wells in a lower-dimensional space, making it easier for operators to identify clusters and outliers. Additionally, the classification process may include a confidence scoring mechanism, providing operators with an indication of how reliably each well has been assigned to its category. This confidence score can be particularly useful when making decisions about wells that exhibit characteristics of multiple categories or when dealing with wells that have limited historical data.

Step 210 may involve performance benchmarking and generating optimization recommendations. Based on the well classifications and identified patterns, the system may establish performance benchmarks for each well category. These benchmarks may serve as reference points for evaluating individual well performance and identifying underperforming assets. The system may then generate optimization recommendations, such as adjusting gas injection rates, modifying production parameters, or scheduling maintenance activities, to improve well performance relative to the established benchmarks.

In some aspects, the performance benchmarking and optimization recommendation process may incorporate advanced statistical techniques and machine learning algorithms to provide more nuanced and actionable insights. The system may utilize ensemble methods, combining multiple benchmarking approaches to create more robust and reliable performance standards. These benchmarks may be dynamically updated based on real-time data, allowing for adaptive performance evaluation that accounts for changing reservoir conditions and operational parameters. The optimization recommendations generated by the system may be prioritized based on their potential impact and feasibility, taking into account factors such as resource availability, operational constraints, and economic considerations. Additionally, the system may employ scenario analysis and predictive modeling to simulate the potential outcomes of different optimization strategies, enabling operators to make more informed decisions about which recommendations to implement.

Step 212 focuses on real-time monitoring and alarm generation. In this step, the system may continuously monitor incoming data from the oilfield sensors and compares it to the expected behavior based on the physics-based models and machine learning predictions. When significant deviations or anomalies are detected, the system may generate alarms or alerts to notify operators of potential issues. These alarms may be prioritized based on the severity and potential impact of the detected anomalies, allowing operators to respond quickly to critical situations and maintain improved (e.g. optimal) production levels across the oilfield.

In some aspects, the real-time monitoring and alarm generation system may incorporate anomaly detection algorithms that can identify subtle deviations from expected behavior before they escalate into critical issues. These algorithms may utilize machine learning techniques such as autoencoders or isolation forests to detect anomalies in high-dimensional data spaces, allowing for the identification of complex patterns that may not be apparent through traditional threshold-based monitoring. The system may also employ time series analysis techniques to detect temporal anomalies, such as sudden changes in trends or cyclical patterns. Additionally, the alarm generation module may include a self-learning component that continuously refines its detection criteria based on historical alarm data and operator feedback, improving its accuracy and reducing false positives over time. This adaptive approach may enable the system to maintain its effectiveness even as oilfield conditions and operational parameters evolve.

A specific use case for the process illustrated in FIG. 2 may involve optimizing the performance of a mature oilfield with declining production rates. In this scenario, an oil company aims to identify underperforming wells and implement targeted interventions to maximize overall field productivity.

The process may begin with step 202, where real-time GOR and WC data are collected from sensors installed on each well in the field. Historical production data, including past interventions and their outcomes, are also gathered from the company's databases. This dataset provides a foundation for the subsequent analysis.

In step 204, the physics-based modeling module may simulate vertical pressure profiles for each well using the collected GOR and WC data. These simulations may reveal potential flow issues, such as gas or water coning, that may be impacting well performance. The module may also generate predictions of well behavior under various operating conditions, providing insights into the potential effectiveness of different intervention strategies.

Step 206 may involve the machine learning analysis of both the physics-based model outputs and the historical data. The machine learning module may identify subtle patterns in well performance that correlate with specific reservoir characteristics or operational parameters. For instance, it might discover that wells with certain GOR and WC trends respond more favorably to particular types of interventions.

In step 208, the system may classify the wells based on their performance characteristics and response patterns. This classification may group wells into categories such as "high performers," "declining producers," and "candidates for intervention." The classification helps prioritize wells for optimization efforts and tailors intervention strategies to each group's specific needs.

Step 210 may focus on establishing performance benchmarks for each well category and generating optimization recommendations. For example, the system might recommend increasing gas lift rates for a group of wells showing signs of liquid loading, while suggesting acidization treatments for another group experiencing formation damage. These recommendations are prioritized based on their potential impact on overall field production and economic considerations.

In step 212, the system may continuously monitor the wells' performance in real-time, comparing actual data to the expected outcomes of the implemented interventions. If a well's response deviates significantly from the predicted behavior, the system generates an alert, allowing operators to quickly adjust their strategy or investigate potential issues before they escalate into more serious problems.

Through this process, the oil company can systematically optimize its mature field's performance, targeting interventions where they are beneficial and likely to be effective, while continuously monitoring and adapting its strategies based on real-time data and advanced analytics.

Referring to FIG. 3, a flowchart illustrates a physics-based modeling process 300. The process 300 may begin with step 302, where GOR and WC data are input into the system. This data may be collected in real-time from oilfield sensors, SCADA systems, and historical records, providing a comprehensive dataset for analysis. The input data may include various parameters related to oilfield operations, such as pressure, temperature, flow rate, and other relevant measurements.

Following data input, the process 300 proceeds to step 304, where fluid dynamics and thermodynamics principles are applied to the input data. In some cases, the physics-based modeling module may incorporate fundamental principles of fluid dynamics, thermodynamics, and reservoir engineering to simulate vertical pressure profiles and predict well performance under various GOR and WC scenarios. For instance, the module may use Darcy's law for fluid flow through porous media or pressure-volume-temperature (PVT) relationships for hydrocarbon mixtures. This step provides a theoretically grounded baseline for well behavior, ensuring that the predictions align with known physical constraints and principles.

In some aspects, the physics-based modeling module may also incorporate advanced numerical methods and computational fluid dynamics (CFD) techniques to enhance the accuracy and resolution of the simulated vertical pressure profiles. These methods may include finite element analysis, finite volume methods, or spectral element methods, which can provide detailed solutions to complex fluid flow equations in heterogeneous porous media. The module may also consider multiphase flow phenomena, such as relative permeability effects and capillary pressure, to more accurately model the interaction between oil, gas, and water phases within the reservoir. Additionally, the physics-based modeling may account for non-Darcy flow effects in high-velocity regions near the wellbore, thermal effects on fluid properties, and geomechanical coupling to capture the impact of stress changes on reservoir permeability and porosity. By incorporating these modeling techniques, the system may provide more detailed and realistic simulations of well behavior, enabling operators to make more informed decisions about production strategies and well interventions.

In step 306, the process 300 may involve simulating vertical pressure profiles based on the applied principles. The physics-based modeling module may generate a theoretical model of the well's pressure profile, taking into account the physical properties of the reservoir, the fluid dynamics of oil and gas flow, and the operational parameters of the well. This simulation provides a detailed representation of the well's behavior under different GOR and WC conditions, allowing for a comprehensive understanding of the well's performance.

In some aspects, the physics-based modeling module may incorporate advanced techniques to enhance the accuracy and realism of the simulated vertical pressure profiles. These techniques may include the use of adaptive mesh refinement algorithms to dynamically adjust the spatial resolution of the simulation in areas of complex flow patterns or rapid pressure changes. The module may also implement multi-scale modeling approaches, allowing for the integration of pore-scale phenomena with reservoir-scale simulations to capture the effects of microscopic heterogeneities on macroscopic flow behavior. Additionally, the simulation may account for transient effects and non-equilibrium conditions, such as those encountered during well start-up or shut-in operations, providing insights into the dynamic response of the well to operational changes. By incorporating these advanced modeling capabilities, the system may generate more accurate and detailed pressure profiles, enabling operators to better understand and predict well behavior under a wide range of conditions and scenarios.

Following the simulation, step 308 may involve generating well performance predictions under various scenarios using the simulated pressure profiles. The physics-based modeling module may use the simulated pressure profiles to predict how the well may perform under different GOR and WC conditions. These predictions can provide insights into the potential impact of changes in GOR and WC on well performance, aiding in the development of effective operational strategies.

In some aspects, the physics-based modeling module may incorporate sensitivity analysis and uncertainty quantification techniques to enhance the robustness of the well performance predictions. These techniques may involve running multiple simulations with varying input parameters to assess the impact of uncertainties in reservoir properties, fluid characteristics, or operational conditions on the predicted well performance. The module may also employ Monte Carlo simulations to generate probability distributions of potential outcomes, providing operators with a more comprehensive understanding of the range of possible well behaviors under different scenarios. Additionally, the system may integrate historical production data with the physics-based predictions to calibrate and refine the models, improving their accuracy over time. This hybrid approach, combining theoretical modeling with empirical data, may enable more reliable forecasting of well performance and support more informed decision-making in oilfield operations.

In step 310, the results are output for machine learning (ML) analysis. The output from the physics-based modeling process 300, including the simulated pressure profiles and well performance predictions, may be fed into a machine learning module for further analysis. This step marks the transition from physics-based modeling to data-driven analysis, leveraging the strengths of both approaches to provide more accurate and comprehensive insights into oilfield performance.

In some aspects, the integration of physics-based modeling outputs with machine learning analysis may enable the system to capture complex, non-linear relationships that may not be apparent through either approach alone. The machine learning module may utilize advanced algorithms, such as deep neural networks or ensemble methods, to identify subtle patterns and correlations in the combined dataset of simulated pressure profiles, well performance predictions, and historical production data. This hybrid approach may allow for more accurate predictions of well behavior under various operational conditions, as well as the identification of previously unrecognized factors influencing well performance. Additionally, the machine learning module may continuously refine its models based on the ongoing comparison between predicted and actual well performance, potentially uncovering new insights into reservoir dynamics and improving the overall accuracy of the system's recommendations for oilfield optimization.

In some aspects, the physics-based modeling process 300 may be adjusted or modified based on specific operational requirements or reservoir characteristics. For instance, the physics-based modeling module may incorporate additional physical principles or equations or use different methods for simulating pressure profiles or predicting well performance. Similarly, the input data may include additional parameters or measurements, or be collected from different sources or at different intervals. These variations allow the physics-based modeling process 300 to be tailored to the specific needs of each oilfield, enhancing its flexibility and applicability.

Continuing with the specific use case, the oil company proceeds to apply the physics-based modeling process outlined in FIG. 3 to optimize the performance of their mature oilfield with declining production rates.

In step 302, the company inputs the collected GOR and WC data into the system. This data includes real-time measurements from the oilfield sensors, historical production records, and information from recent well interventions. The comprehensive dataset provides a solid foundation for the subsequent analysis, encompassing both current operational conditions and long-term performance trends.

Moving to step 304, the physics-based modeling module applies fluid dynamics and thermodynamics principles to the input data. For this mature oilfield, the module may incorporate advanced techniques to account for the complexities of aging reservoirs. It may use modified versions of Darcy's law to model fluid flow through potentially damaged or altered porous media, and apply sophisticated PVT relationships that consider the changing composition of reservoir fluids over time. The module may also factor in the effects of previous interventions, such as hydraulic fracturing or chemical treatments, on the reservoir's physical properties.

In step 306, the system simulates vertical pressure profiles for each well in the field. Given the mature nature of the oilfield, these simulations may reveal complex pressure distributions influenced by years of production. For instance, the simulations might identify areas of pressure depletion or zones where water or gas coning is occurring. The module may also simulate how these pressure profiles may change under various operational scenarios, such as different gas injection rates or after potential workover operations.

Step 308 involves generating well performance predictions based on the simulated pressure profiles. For this mature field, the physics-based modeling module may predict how each well may respond to different optimization strategies. For example, it might forecast the production rates that may be achieved by increasing gas lift in wells showing signs of liquid loading, or estimate the potential production gains from acidization treatments in wells suspected of formation damage. These predictions provide the company with quantitative estimates of the potential benefits of different intervention strategies.

In step 310, the results from the physics-based modeling process are output for machine learning analysis. This output includes the detailed pressure profile simulations, performance predictions under various scenarios, and the underlying physical parameters used in the modeling. By feeding this physics-based data into the machine learning module, the company can enhance its data-driven analysis with theoretically grounded insights, potentially uncovering optimization opportunities that neither approach may identify alone.

Referring to FIG. 4, a flowchart illustrates a machine learning analysis workflow process 400. The process 400 may begin with step 402, where physics-based model outputs and historical data are input into the machine learning model server 116. This input data may include the simulated pressure profiles and well performance predictions generated by the physics-based modeling server 114, as well as historical production records and other relevant data. The input data provides a comprehensive dataset for the machine learning analysis, combining theoretical insights from the physics-based models with empirical evidence from historical data.

Following data input, the process 400 may proceed to step 404, where the data is preprocessed and normalized. This step may involve various data cleaning and transformation operations, such as handling missing values, removing outliers, scaling or normalizing numerical values, and encoding categorical variables. The preprocessing and normalization ensure that the data is in a suitable format for the subsequent machine learning analysis, improving the accuracy and reliability of the results.

In some aspects, the preprocessing and normalization step may also include feature engineering techniques to create new, meaningful variables from the raw data. This may involve combining existing features, extracting temporal information from time-series data, or applying domain-specific transformations based on petroleum engineering principles. The system may also employ advanced techniques such as principal component analysis (PCA) or autoencoders to reduce the dimensionality of the dataset while preserving information, potentially uncovering latent features that may significantly impact well performance predictions.

In step 406, the process 400 involves applying supervised learning techniques for performance prediction. The machine learning model server 116 may use various supervised learning algorithms, such as linear regression, decision trees, or support vector machines, to train models that can predict well performance based on the input data. These models learn to map the input features (e.g., pressure profiles, GOR and WC values) to the target output (e.g., oil production rate), allowing them to make predictions for new data.

In some cases, the supervised learning step may incorporate ensemble methods, such as random forests or gradient boosting machines, to improve prediction accuracy and robustness. The system may also employ advanced techniques like neural networks or deep learning models to capture complex, non-linear relationships in the data. Additionally, the machine learning model server 116 may implement automated machine learning (AutoML) techniques to optimize model selection and hyperparameter tuning, ensuring that the most appropriate algorithms and configurations are used for each specific prediction task.

Following the supervised learning, step 408 involves the use of unsupervised learning algorithms for well classification and pattern recognition. The machine learning model server 116 may use algorithms such as k-means clustering, hierarchical clustering, or principal component analysis to identify natural groupings or patterns in the data. These algorithms can classify wells into different groups based on their performance characteristics, helping to identify similarities and differences among wells that might not be immediately apparent from the physics-based models alone.

In some aspects, the unsupervised learning step may incorporate more advanced clustering techniques, such as DBSCAN (Density-Based Spatial Clustering of Applications with Noise) or Gaussian Mixture Models, to handle complex data distributions and identify clusters of varying shapes and densities. The system may also employ dimensionality reduction techniques like t-SNE (t-Distributed Stochastic Neighbor Embedding) or UMAP (Uniform Manifold Approximation and Projection) to visualize high-dimensional data in lower-dimensional spaces, facilitating the identification of patterns and relationships among wells. Additionally, the machine learning model server 116 may implement anomaly detection algorithms to identify wells with unusual characteristics or performance patterns, potentially uncovering opportunities for targeted optimization or intervention.

In step 410, the process 400 may involve generating performance benchmarks. The machine learning model server 116 may use the results from the supervised and unsupervised learning to establish baseline metrics for evaluating reservoir productivity. These benchmarks provide a standard against which individual well performance can be measured, enabling the identification of underperforming wells and areas for improvement.

In some cases, the performance benchmarking step may incorporate statistical techniques such as bootstrap sampling or cross-validation to assess the reliability and uncertainty of the established benchmarks. The system may also implement adaptive benchmarking methods that automatically adjust the performance standards based on changing reservoir conditions or operational parameters over time. Additionally, the machine learning model server 116 may generate personalized benchmarks for individual wells or groups of wells, taking into account their specific characteristics and historical performance, to provide more relevant and actionable insights for optimization.

In step 412, the process 400 may involve outputting the results for optimization and decision-making. The output from the machine learning analysis process 400, including the performance predictions, well classifications, and performance benchmarks, may be transmitted to the user interface dashboard 120 for display. This step presents the analyzed data and insights in a format that can be used to inform operational strategies and improve well management.

In some aspects, the output step may include advanced visualization techniques, such as interactive dashboards or 3D reservoir models, to present the complex relationships and insights derived from the machine learning analysis in an intuitive and accessible manner. The system may also generate automated reports summarizing key findings, recommendations, and potential optimization strategies based on the analysis results. Additionally, the machine learning model server 116 may implement a feedback loop that allows users to input their domain expertise or operational decisions back into the system, continuously refining and improving the machine learning models and recommendations over time.

In some aspects, the machine learning analysis process 400 may be adjusted or modified based on specific operational requirements or data characteristics. For instance, the machine learning model server 116 may incorporate additional machine learning algorithms, use different methods for data preprocessing and normalization, or apply different techniques for performance prediction, well classification, and benchmark generation. Similarly, the input data may include additional parameters or measurements, or be collected from different sources or at different intervals. These variations allow the machine learning analysis process 400 to be tailored to the specific needs of each oilfield, enhancing its flexibility and applicability.

Continuing with the specific use case, the oil company proceeds to apply the machine learning analysis workflow process outlined in FIG. 4 to optimize the performance of their mature oilfield with declining production rates.

In step 402, the company inputs the physics-based model outputs and historical data into the machine learning model server 116. This comprehensive dataset includes the simulated vertical pressure profiles for each well, the performance predictions under various scenarios, and historical production records spanning several years. The data also incorporates information about past interventions, such as workover operations and chemical treatments, providing a rich context for the analysis.

Moving to step 404, the system preprocesses and normalizes the input data. For this mature oilfield, this step may involve handling missing data points from older wells with incomplete records, removing outliers that may be due to equipment malfunctions or measurement errors, and scaling the data to ensure consistency across different measurement units. The system may also create new features, such as the rate of change in GOR or WC over time, which may be indicative of reservoir depletion or water breakthrough in this aging field.

In step 406, the machine learning model server 116 applies supervised learning techniques to predict well performance. Given the complex nature of this mature field, the system may employ ensemble methods like random forests or gradient boosting machines to capture the intricate relationships between various factors affecting well productivity. These models may be trained to predict not only future production rates but also the likelihood of well failures or the expected outcomes of different intervention strategies.

The process then moves to step 408, where unsupervised learning algorithms are used for well classification and pattern recognition. In this mature field with numerous wells, the system may use advanced clustering techniques to group wells based on their performance characteristics, geological features, and response to past interventions. This classification may reveal clusters of wells that are candidates for specific optimization strategies, such as those suitable for gas lift optimization or those requiring formation damage treatment.

In step 410, the system generates performance benchmarks based on the analysis results. For this mature field, the benchmarks may be particularly nuanced, taking into account the age of each well, its production history, and its position within the reservoir. The system may establish different performance standards for wells in different parts of the field or at different stages of their lifecycle, providing a more accurate basis for evaluating individual well performance.

In step 412, the results are output for optimization and decision-making. The user interface dashboard 120 may display interactive visualizations showing the classified well groups, predicted performance under different scenarios, and recommended intervention strategies for each well or group of wells. This output may include specific recommendations, such as prioritizing gas lift optimization for a cluster of wells showing signs of liquid loading or suggesting acidization treatments for another group experiencing formation damage.

Referring to FIG. 5, a flowchart illustrates a real-time monitoring and alarm generation process 500. The process 500 begins with step 502, where real-time GOR and WC data are continuously collected. This step may involve gathering real-time data from oilfield sensors, SCADA systems, and other data sources. The collected data provides up-to-date information on well performance, enabling the system to monitor changes in GOR and WC values in real-time.

Following data collection, the process 500 proceeds to step 504, where the incoming data may be compared to established benchmarks and patterns. This step may involve comparing the real-time GOR and WC data to baseline values or expected trends derived from the physics-based modeling and machine learning analysis. The comparison allows the system to detect any deviations from expected behavior, which may indicate potential issues or anomalies in well performance.

In some aspects, the comparison process in step 504 may utilize advanced statistical techniques and machine learning algorithms to enhance the detection of subtle deviations or emerging trends. The system may employ time series analysis methods, such as ARIMA (Autoregressive Integrated Moving Average) or Prophet, to model the expected behavior of GOR and WC values over time, taking into account seasonal variations and long-term trends. Additionally, the comparison may incorporate dynamic thresholds that adapt to changing operational conditions, reservoir characteristics, or production stages. This adaptive approach allows the system to maintain sensitivity to anomalies while reducing false alarms that might occur due to natural fluctuations in well performance. The comparison process may also leverage ensemble methods, combining multiple detection algorithms to improve the robustness and accuracy of anomaly identification across diverse well conditions and operational scenarios.

In step 506, the process 500 involves detecting anomalies or deviations from expected behavior. This step may involve identifying any significant changes in GOR or WC values, sudden shifts in well performance, or other unusual patterns in the data. The detection of anomalies is facilitated by the machine learning module, which can learn complex patterns and relationships in the data and identify deviations that might not be immediately apparent from the raw data alone.

In addition to detecting anomalies based on deviations in GOR and WC values, the machine learning module may also utilize predictive analytics to forecast potential issues before they manifest as observable anomalies. By analyzing trends and patterns over time, the module can identify early warning signs of equipment failure, reservoir depletion, or other operational challenges. This proactive approach allows for timely interventions that can prevent costly downtime and optimize well performance. Furthermore, the machine learning module may integrate data from various sources, including seismic data, geological models, and operational logs, to enhance the accuracy and comprehensiveness of its anomaly detection capabilities. This integration enables a more holistic view of well health and performance, facilitating more informed decision-making and strategic planning.

Following anomaly detection, step 508 involves generating an appropriate level of alarm based on the severity of the detected anomaly. The system may include an alarm generation module configured to generate alerts when deviations from expected behavior occur. The alarm generation module may be configured to generate different levels of alarms based on the severity of detected anomalies. For instance, minor deviations might trigger a low-level alert, while major anomalies may generate a high-level alarm requiring immediate attention.

The alarm generation module is designed to be highly configurable, allowing for customization of alarm parameters and thresholds to suit specific operational needs. This flexibility ensures that the alarms are both relevant and timely, enhancing the responsiveness of the operations team to potential issues. The module may also interface with other systems, such as automated control systems or maintenance scheduling tools, to initiate corrective actions automatically based on the severity of the detected anomalies. This integration can help streamline operations and reduce the risk of human error, further optimizing well performance and safety. Additionally, the alarm generation module may record and analyze the history of alarms and responses to improve its predictive capabilities over time, learning from past events to better anticipate and mitigate future risks.

In step 510, the operations team is alerted for intervention. This step may involve transmitting the generated alarms to the operations team via the user interface dashboard 120 or other communication channels. The alerts provide the operations team with timely information about potential issues, enabling them to take proactive measures to address the anomalies and minimize operational downtime.

In some aspects, the alert transmission system may incorporate advanced communication technologies to ensure rapid and reliable delivery of alerts to the operations team. This may include the use of redundant communication channels, such as SMS, email, push notifications to mobile devices, and integration with existing operational communication systems. The alerts may be prioritized and routed based on their severity and the specific expertise required for intervention, ensuring that the most critical issues are addressed promptly by the most qualified personnel. Additionally, the system may provide contextual information along with the alerts, such as historical data, relevant well characteristics, and suggested intervention strategies, empowering the operations team to make informed decisions quickly and effectively. This comprehensive approach to alert management can significantly enhance the responsiveness and efficiency of oilfield operations, potentially leading to improved production outcomes and reduced operational risks.

In some aspects, the real-time monitoring and alarm generation process 500 may be adjusted or modified based on specific operational requirements or data characteristics. For instance, the data collection frequency, anomaly detection thresholds, or alarm generation criteria may be customized to suit the specific needs of each oilfield. These variations allow the real-time monitoring and alarm generation process 500 to be tailored to the specific needs of each oilfield, enhancing its flexibility and applicability.

Continuing with the same specific use case, the oil company implements the real-time monitoring and alarm generation process outlined in FIG. 5 to maintain improved (e.g. optimal) performance of their mature oilfield.

In step 502, the company's system continuously collects real-time GOR and WC data from sensors installed on each well. This data is transmitted through the SCADA system, providing up-to-the-minute information on well performance. For this mature field, the continuous data collection is beneficial as it allows for immediate detection of any changes that might indicate declining performance or potential issues.

As the data flows in, step 504 is executed, where the system compares the incoming GOR and WC values to the established benchmarks and patterns. These benchmarks, derived from the earlier physics-based modeling and machine learning analysis, are tailored to each well's specific characteristics and historical performance. For instance, a well that has historically shown stable GOR values might have tighter thresholds for deviation, while a well with more variable performance might have more flexible benchmarks.

In step 506, the system's advanced anomaly detection algorithms analyze the data to identify any deviations from expected behavior. In this mature field, the system might detect subtle changes that may indicate the onset of problems common in aging wells. For example, it might identify a gradual increase in water cut in a particular well, potentially signaling water breakthrough. Or it might detect a sudden spike in GOR, which may indicate gas coning or a casing integrity issue.

When anomalies are detected, step 508 comes into play, where the system generates alarms of appropriate severity. For the mature field, the alarm generation module might be configured with multiple levels of alerts to address the complex issues that can arise. A minor increase in water cut might trigger a low-level alert, prompting the operations team to monitor the well more closely. On the other hand, a significant and sudden change in GOR may generate a high-priority alarm, indicating a potential critical issue that requires immediate attention.

In step 510, these alarms are transmitted to the operations team. Given the critical nature of maintaining production in a mature field, the company might have implemented a multi-channel alert system. High-priority alarms may be sent simultaneously via the user interface dashboard, SMS, and email to ensure rapid response. The alerts might include not just the alarm details but also contextual information about the well's history, recent interventions, and suggested next steps based on similar past incidents in the field.

By implementing this real-time monitoring and alarm generation process, the oil company can proactively manage the challenges associated with a mature oilfield, quickly identifying and addressing issues to maintain improved (e.g. optimal) production levels and extend the field's productive life.

Referring to FIG. 6, a flowchart illustrates a gas allocation optimization process 600. The process 600 begins with step 602, where current gas allocation and well performance data are input into the system. This data may include information on the current distribution of gas resources among the wells, as well as real-time and historical performance data for each well. The input data provides a comprehensive dataset for the gas allocation optimization, enabling the system to consider both current operational parameters and past performance trends.

Following data input, the process 600 proceeds to step 604, where machine learning models are used to predict post-lifting production for each well based on the input data. The machine learning model server 116 may use various machine learning algorithms, such as regression models, decision trees, or neural networks, to predict the amount of oil that each well may produce after lifting operations. These predictions take into account the current GOR and WC values, the vertical pressure profiles, and other relevant parameters. By predicting post-lifting production, the system can estimate the potential impact of different gas allocation strategies on well performance.

In some aspects, the machine learning models used for predicting post-lifting production may incorporate ensemble methods to enhance the accuracy and robustness of the predictions. These ensemble methods may combine multiple machine learning algorithms, such as random forests, gradient boosting machines, and deep neural networks, to leverage the strengths of each approach. The system may also employ transfer learning techniques, allowing it to apply knowledge gained from well-studied wells to make more accurate predictions for wells with limited historical data. Additionally, the machine learning models may be designed to handle uncertainty and variability in the input data, using techniques such as Bayesian inference or Monte Carlo simulations to provide probabilistic predictions of post-lifting production. This approach can offer a more nuanced understanding of the potential outcomes of different gas allocation strategies, enabling operators to make more informed decisions while accounting for uncertainties in oilfield operations.

In step 606, the process 600 involves optimizing gas distribution based on the predictions and constraints. The system may include an optimization module configured to adjust the allocation of gas resources among the wells to maximize overall field productivity. The optimization may involve reducing gas injection for underperforming wells and increasing allocation to wells with better production potential. The optimization module may consider various constraints, such as the total amount of gas available for lifting purposes, the operational capacity of each well, and regulatory or environmental restrictions.

In some aspects, the optimization module may employ advanced algorithms such as linear programming, mixed-integer programming, or genetic algorithms to solve the complex gas allocation problem. These algorithms can handle multiple objectives and constraints simultaneously, allowing for a more comprehensive optimization approach. The module may also incorporate real-time data feedback loops, enabling dynamic adjustments to the gas allocation strategy as conditions change. This adaptive optimization capability can help maintain improved (e.g. optimal) field performance even in the face of unexpected events or changing reservoir conditions. Additionally, the optimization module may consider economic factors such as gas prices, lifting costs, and production targets, allowing for a holistic optimization that balances technical and financial considerations. By integrating these advanced features, the gas allocation optimization process can provide more robust and flexible solutions, potentially leading to significant improvements in overall field productivity and operational efficiency.

Following optimization, step 608 involves generating reallocation recommendations. The system may generate a set of recommendations for adjusting gas allocation among the wells, based on the results of the optimization. These recommendations provide actionable insights for the operations team, enabling them to implement changes that can improve overall field productivity and economic returns.

In some aspects, the reallocation recommendations generated by the system may be presented in a prioritized format, ranking the suggested changes based on their potential impact on field productivity and economic returns. The recommendations may include detailed explanations of the expected outcomes for each proposed adjustment, including projected increases in oil production, changes in gas-oil ratio, and estimated financial benefits. Additionally, the system may provide alternative scenarios for each recommendation, allowing operators to evaluate different approaches and their potential consequences. These comprehensive recommendations may also incorporate risk assessments, highlighting any potential challenges or uncertainties associated with implementing the suggested changes. By providing such detailed and contextualized recommendations, the system empowers the operations team to make well-informed decisions about gas allocation strategies, balancing short-term gains with long-term field management objectives.

In step 610, the recommended changes are implemented and the results are monitored. The operations team may implement the recommended changes in gas allocation, and the system continues to monitor well performance in real-time. This allows the system to assess the effectiveness of the implemented recommendations and provide ongoing optimization suggestions. The system's ability to continuously monitor well performance and adjust recommendations based on real-time data contributes to its adaptability and effectiveness in optimizing oilfield operations.

In some aspects, the system may incorporate advanced feedback mechanisms to enhance its monitoring and optimization capabilities. These mechanisms may include automated performance tracking algorithms that compare actual well performance against predicted outcomes, allowing for rapid identification of any discrepancies. The system may also employ machine learning techniques to analyze the effectiveness of implemented changes over time, continuously refining its predictive models and optimization strategies based on observed results. Additionally, the system may integrate with other operational systems, such as production scheduling and maintenance planning tools, to provide a holistic view of field operations and enable more comprehensive optimization. This integrated approach may allow for the consideration of factors beyond gas allocation, such as equipment maintenance schedules or workforce availability, in the ongoing optimization process. By leveraging these advanced monitoring and analysis capabilities, the system can provide increasingly accurate and context-aware recommendations, further improving its ability to optimize oilfield operations in real-time.

In some aspects, the gas allocation optimization process 600 may be adjusted or modified based on specific operational requirements or data characteristics. For instance, the machine learning algorithms used for performance prediction may be selected or tuned based on the characteristics of the data, the optimization module may incorporate different optimization algorithms or criteria, and the reallocation recommendations may be customized based on the specific needs and constraints of the oilfield. These variations allow the gas allocation optimization process 600 to be tailored to the specific needs of each oilfield, enhancing its flexibility and applicability.

Continuing with the same specific use case, the oil company proceeds to implement the gas allocation optimization process outlined in FIG. 6 to further enhance the performance of their mature oilfield.

In step 602, the company inputs the current gas allocation data and well performance metrics into the system. This data includes the existing gas injection rates for each well, recent production figures, and real-time GOR and WC values collected from the field sensors. The company also inputs historical performance data, including past gas allocation strategies and their outcomes, to provide context for the optimization process.

Moving to step 604, the system's machine learning models analyze this comprehensive dataset to predict post-lifting production for each well. Given the mature nature of the field, the models may incorporate ensemble methods that combine multiple algorithms to account for the complex behavior of aging wells. For instance, the system might use a combination of gradient boosting machines to capture non-linear relationships in the data and long short-term memory (LSTM) neural networks to account for temporal dependencies in well performance.

The predictions generated in this step provide estimates of how each well may respond to different gas injection rates. For example, the model might predict that increasing gas injection in a particular well may boost oil production by 15%, while another well might show diminishing returns beyond a certain injection rate due to gas breakthrough.

In step 606, the system's optimization module uses these predictions to determine the improved (e.g. optimal) gas distribution across the field. For this mature oilfield, the optimization process may need to balance multiple objectives, such as maximizing overall oil production, minimizing water production, and ensuring efficient use of available gas resources. The system might employ a multi-objective genetic algorithm to handle these competing goals, generating a Pareto front of optimal solutions that the operations team can evaluate.

The optimization process takes into account various constraints specific to the mature field. These might include limitations on total available gas for injection, maximum allowable injection pressures for older wells with reduced mechanical integrity, and regulatory restrictions on production from certain zones. The system may also consider economic factors, such as the cost of gas compression and the current oil price, to ensure that the proposed allocation strategy maximizes not just production, but also profitability.

In step 608, based on the optimization results, the system generates a set of reallocation recommendations. For this mature field, these recommendations might include suggestions such as:

1. Increasing gas injection by 20% in a group of wells showing favorable GOR trends and good production potential.

2. Reducing gas allocation to wells with high water cut, redirecting this gas to more productive zones.

3. Implementing a cyclic gas injection strategy for a cluster of wells to mitigate gas breakthrough issues.

Each recommendation is accompanied by detailed projections of expected outcomes, including estimated changes in oil and water production, gas utilization efficiency, and economic impact.

In step 610, the operations team implements these recommendations, adjusting gas injection rates across the field according to the system's suggestions. The real-time monitoring system continues to track well performance, comparing actual results with the predicted outcomes. This ongoing monitoring allows the system to validate its models and recommendations, continuously learning and adapting its strategies based on the observed results.

For instance, if a particular well responds better than expected to increased gas injection, the system might automatically suggest further optimization for that well in the next iteration. Conversely, if another well shows signs of unexpected behavior, such as rapid water breakthrough following increased gas injection, the system can quickly alert the operations team and suggest corrective actions.

By implementing this gas allocation optimization process, the oil company can systematically improve the performance of their mature field, maximizing production from existing resources and extending the economic life of the asset. The continuous nature of the process ensures that the optimization strategy remains effective even as reservoir conditions evolve over time.

Referring to FIG. 7, a flowchart illustrates a continuous improvement process 700 for oilfield performance optimization. The process 700 begins with step 702, where new performance data is collected after implementing the recommendation for well operations. This step involves gathering updated information on well performance following the application of previously suggested optimizations. The new performance data may include real-time measurements of GOR and WC, as well as other relevant operational parameters. This data provides feedback on the effectiveness of the implemented recommendations, enabling the system to learn from the results and refine its models and strategies accordingly.

Following data collection, the process 700 proceeds to step 704, where the physics-based modeling module and the machine learning module are updated with the new performance data. This step involves incorporating the newly collected data into the existing models, allowing them to adapt and evolve based on the latest information. The physics-based modeling module may adjust its simulations and predictions based on the new data, while the machine learning module may retrain its algorithms to better capture the updated patterns and relationships in the data. This continuous updating of the models ensures that they remain current and accurate, enhancing the reliability of the system's predictions and recommendations.

In some aspects, the updating process in step 704 may involve more advanced techniques to enhance the adaptability and accuracy of the models. For instance, the physics-based modeling module may employ adaptive mesh refinement algorithms to dynamically adjust the spatial resolution of its simulations in areas where the new data indicates complex or rapidly changing reservoir conditions. The machine learning module, on the other hand, may utilize transfer learning techniques to efficiently incorporate new knowledge without requiring a complete retraining of the models. This approach allows the system to quickly adapt to new patterns or relationships in the data while retaining insights from previous training. Additionally, the system may implement ensemble methods that combine multiple updated models, weighted based on their performance with the new data, to generate more robust and reliable predictions. These advanced updating techniques may enable the system to more effectively capture the dynamic nature of oilfield operations and provide increasingly accurate recommendations over time.

In step 706, the process 700 involves refining predictions and optimization strategies based on the updated physics-based modeling module and machine learning module. This step may involve adjusting the system's performance benchmarks, updating the well classifications, or modifying the optimization recommendations based on the updated models. The refined predictions and strategies provide more accurate and relevant insights for oilfield operations, enabling the system to continuously improve its performance analysis and optimization capabilities.

In some aspects, the refinement process in step 706 may incorporate advanced techniques to enhance the system's predictive and optimization capabilities. The system may employ sensitivity analysis to identify the most influential parameters affecting well performance, allowing for more targeted optimization strategies. Additionally, the system may utilize scenario modeling to evaluate the potential outcomes of different optimization approaches under various reservoir conditions and operational constraints. This scenario-based approach may enable the operations team to make more informed decisions by considering a range of possible futures. The system may also implement adaptive learning algorithms that can automatically adjust the weighting of different optimization criteria based on their historical effectiveness, ensuring that the strategies evolve in response to changing field conditions and operational priorities. By incorporating these advanced refinement techniques, the system can provide increasingly sophisticated and context-aware recommendations, further enhancing its ability to optimize oilfield performance over time.

In step 708, the process 700 indicates that the process may be repeated for ongoing optimization. This step emphasizes the cyclical nature of the optimization process, where continuous data collection, model updates, and generation of new insights lead to iterative improvements in oilfield performance. By maintaining a continuous feedback loop, the system can adapt to changes in well performance, operational parameters, or external conditions, ensuring that its analysis and recommendations remain relevant and effective over time.

In some aspects, the continuous improvement process may incorporate advanced machine learning techniques such as reinforcement learning to further enhance its adaptability and effectiveness. This approach allows the system to learn from its own decisions and their outcomes, continuously refining its optimization strategies based on real-world results. The reinforcement learning algorithm may be designed to balance exploration of new strategies with exploitation of known effective approaches, ensuring that the system can discover innovative solutions while maintaining reliable performance. Additionally, the process may integrate external data sources, such as market conditions, weather patterns, or regulatory changes, to provide a more comprehensive context for optimization decisions. This holistic approach enables the system to anticipate and respond to a wider range of factors that may impact oilfield performance, further improving its ability to generate insights and recommendations over time.

In some aspects, the continuous improvement process 700 may be adjusted or modified based on specific operational requirements or data characteristics. For instance, the frequency of data collection, the methods for updating the models, or the techniques for refining predictions and strategies may be customized to suit the specific needs of each oilfield. These variations allow the continuous improvement process 700 to be tailored to the specific needs of each oilfield, enhancing its flexibility and applicability.

Continuing with the same specific use case, the oil company implements the continuous improvement process outlined in FIG. 7 to further enhance the performance of their mature oilfield.

In step 702, the company begins collecting new performance data after implementing the gas allocation optimization recommendations. This data includes real-time measurements of GOR and WC from each well, as well as production rates, pressure readings, and other relevant operational parameters. For instance, the wells that received increased gas injection are closely monitored to verify the predicted 15% boost in oil production, while wells with reduced gas allocation are observed for any changes in water cut.

Moving to step 704, the system updates both the physics-based modeling module and the machine learning module with this new performance data. The physics-based model refines its simulations of vertical pressure profiles based on the observed responses to the gas allocation changes. Concurrently, the machine learning algorithms, including the gradient boosting machines and LSTM neural networks, are retrained with the new data. This update allows the system to capture any shifts in well behavior or reservoir dynamics that occurred as a result of the optimization efforts.

In step 706, the system refines its predictions and optimization strategies based on these updated models. It may adjust its performance benchmarks for different well categories, taking into account the actual responses to the implemented changes. For example, if the group of wells that received a 20% increase in gas injection consistently outperformed predictions, the system might revise its benchmarks upward for similar well types. The optimization strategies are also refined, potentially suggesting more aggressive gas injection for certain well clusters or recommending different cyclic injection patterns based on the observed results.

In step 708, the process cycles back to the beginning, emphasizing the ongoing nature of the optimization effort. The operations team reviews the refined predictions and updated recommendations, implementing further adjustments to the gas allocation strategy. This might involve fine-tuning the injection rates for specific wells, expanding the cyclic injection approach to additional well clusters, or exploring new optimization opportunities identified by the system's analysis of the latest data.

By continuously repeating this process, the oil company can adapt its optimization strategy to the evolving conditions of the mature field, ensuring sustained improvements in production efficiency and economic performance over time.

Figure 8A:
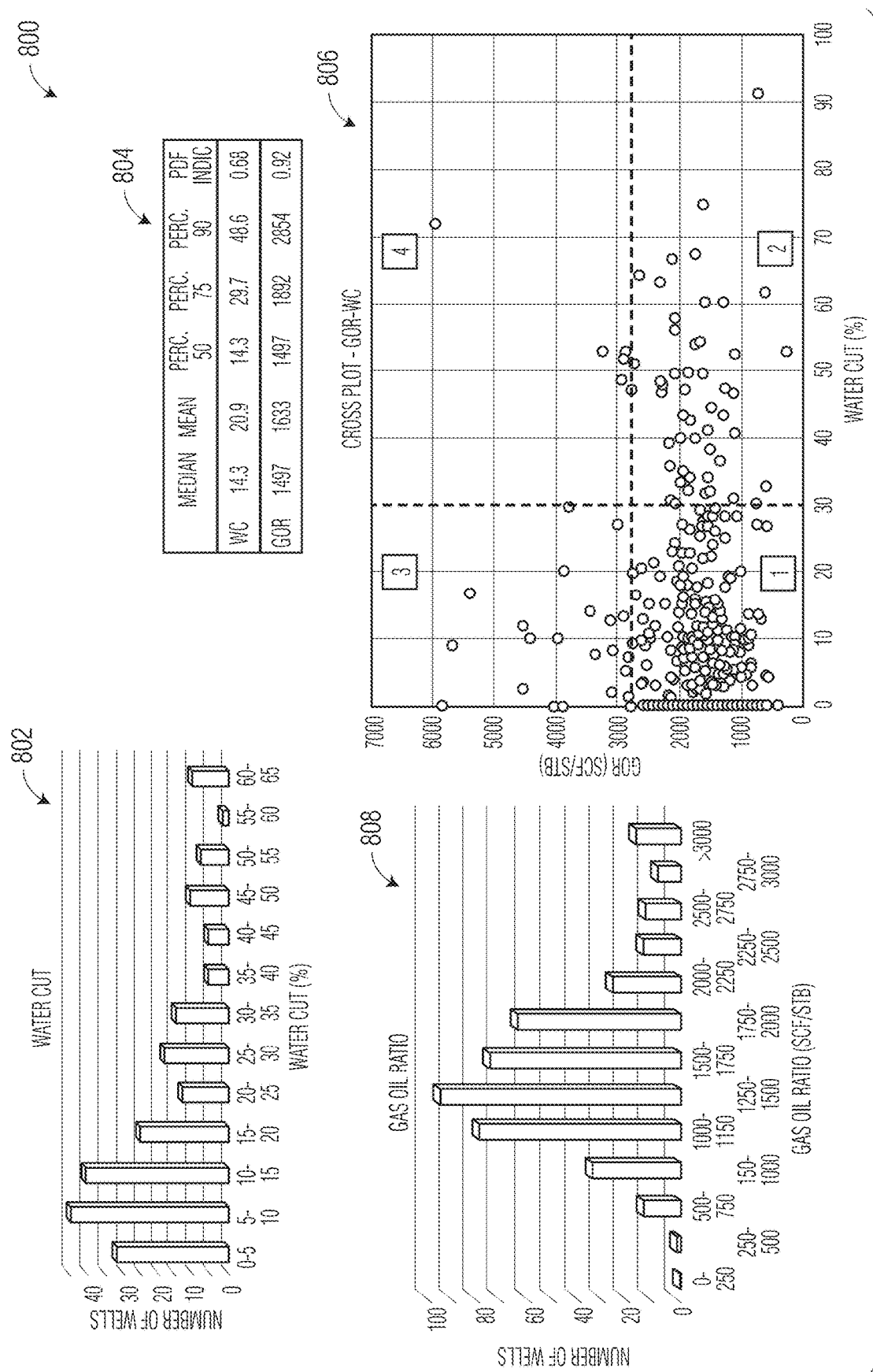
FIG. 8A depicts a graphical user interface for analyzing oilfield performance data, according to an embodiment.

Referring to FIG. 8A, a graphical user interface (GUI) 800 is depicted, which is configured to display oilfield performance data. The GUI 800 comprises several components that display different aspects of the data. A water cut chart 802 is positioned in the upper left corner, showing the distribution of water cut percentages. Adjacent to it is a statistical data table 804 presenting median, mean, and percentile values for GOR and WC. The central area of the GUI 800 features a cross plot graph 806, which plots GOR against water cut percentage. This graph is divided into quadrants and includes numerous data points representing individual wells. In the lower left corner, a gas oil ratio chart 808 displays the distribution of GOR values using horizontal bars. The GUI 800 integrates these visual elements to provide a comprehensive view of the oilfield's performance metrics.

The dense cluster of data points in quadrant 1 of the cross plot graph 806, representing wells with low water cut and low GOR, may be particularly significant for oilfield performance analysis and optimization. This cluster may indicate a group of high-performing wells that are producing primarily oil with minimal water and gas, potentially representing the most economically valuable assets in the field. The concentration of wells in this quadrant may suggest improved (e.g. optimal) reservoir conditions or effective production strategies in certain areas of the oilfield, providing insights for replicating these conditions or strategies across other wells. Additionally, this cluster may serve as a benchmark for ideal well performance, guiding optimization efforts for wells in other quadrants and informing decisions on resource allocation and intervention priorities to maximize overall field productivity.

The system's ability to distinguish between high-performing and low-performing wells based on real-time data analysis is beneficial for strategic decision-making. By identifying wells with low water cut and low GOR as high-performing, the system can guide operators to focus resources and optimization efforts on these wells to maximize output and efficiency. Conversely, the identification of low-performing wells—those with high water cut or undesirable GOR levels—enables targeted interventions to mitigate issues such as water breakthrough or gas coning. This strategic allocation of resources not only enhances the productivity of individual wells but also optimizes overall field performance.

Furthermore, the system can leverage the data from high-performing wells to refine its predictive models, making them more accurate and reliable. By understanding the conditions and parameters that lead to improved (e.g. optimal) well performance, the system can simulate scenarios and predict outcomes for other wells under similar conditions. This predictive capability allows for preemptive adjustments to operations, potentially extending the productive life of wells and reducing downtime. Additionally, insights gained from the performance of both high and low-performing wells can inform future drilling and development strategies, ensuring that new wells are designed and operated to replicate the success of the best-performing wells in the field. This continuous cycle of monitoring, analysis, and adjustment, driven by detailed data insights, exemplifies the dynamic nature of modern oilfield management, where data-driven decisions lead to sustained improvements in performance and profitability.

In some aspects, the GUI 800 may be configured to display additional data visualizations or metrics based on the specific needs or preferences of the user. For instance, the GUI 800 may include additional charts or graphs depicting other performance parameters, such as oil rate, pressure, temperature, or flow rate. The GUI 800 may also provide interactive features that allow users to explore the data in more depth, adjust the display settings, or customize the data visualizations. For example, users may be able to zoom in on specific areas of the charts or graphs, filter the data based on certain criteria, or change the color scheme or layout of the visualizations.

In some cases, the GUI 800 may be part of a larger software application or platform that provides additional tools and features for oilfield performance analysis and optimization. For instance, the software application may include modules for data collection, physics-based modeling, machine learning analysis, performance benchmarking, and real-time monitoring, among others. The GUI 800 may serve as the primary interface for interacting with these modules, allowing users to input data, configure settings, run analyses, view results, and implement recommendations.

In other aspects, the GUI 800 may be designed for use on various types of devices, including desktop computers, laptops, tablets, or smartphones. The GUI 800 may be a web-based interface that can be accessed through a web browser, or it may be a standalone software application that is installed on the user's device. The design and layout of the GUI 800 may be responsive or adaptive, adjusting to the screen size and orientation of the device for improved (e.g. optimal) viewing and interaction.

In yet other aspects, the GUI 800 may be integrated with other systems or platforms used in oilfield operations. For instance, the GUI 800 may be connected to a SCADA system, a data storage system, or a network of sensors and devices installed at the oilfield. This integration allows the GUI 800 to receive real-time data, send commands or instructions, and synchronize with other systems for coordinated operation.

Figure 8B:
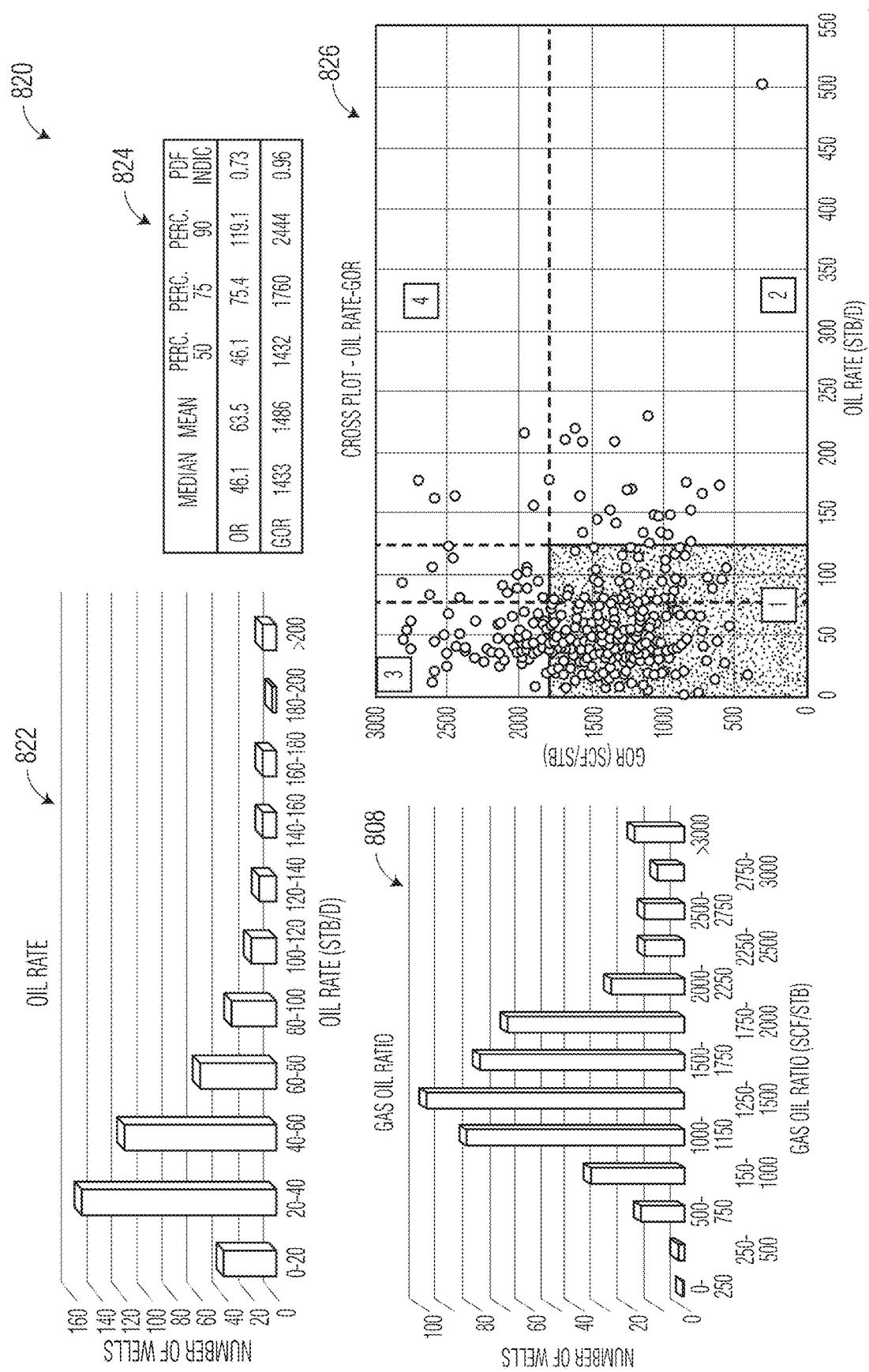
FIG. 8B depicts a graphical user interface for analyzing oil production data, in accordance with example embodiments.

Referring to FIG. 8B, a graphical user interface (GUI) 820 is depicted, which is configured to display oil production data. The GUI 820 comprises several components that display different aspects of the data. An oil rate chart 822 is positioned in the upper left corner, showing the distribution of oil production rates. Adjacent to it is a statistical data table 824 presenting median, mean, and percentile values for oil rate (OR) and GOR. The central area of the GUI 820 features a cross plot oil rate GOR 826, which plots oil rate against gas-oil ratio. This graph is divided into quadrants and includes numerous data points representing individual wells. In the lower left corner, a gas oil ratio chart 828 displays the distribution of GOR values using horizontal bars. The GUI 820 integrates these visual elements to provide a comprehensive view of the oilfield's performance metrics.

In some aspects, the GUI 820 may be configured to display additional data visualizations or metrics based on the specific needs or preferences of the user. For instance, the GUI 820 may include additional charts or graphs depicting other performance parameters, such as pressure, temperature, or flow rate. The GUI 820 may also provide interactive features that allow users to explore the data in more depth, adjust the display settings, or customize the data visualizations. For example, users may be able to zoom in on specific areas of the charts or graphs, filter the data based on certain criteria, or change the color scheme or layout of the visualizations.

In the GUI 820, the dense cluster of data points in cluster 1, representing wells with low GOR and low OR, may indicate a group of wells with specific operational characteristics. These wells, producing a lower volume of both oil and gas, may be indicative of various reservoir conditions or production challenges that require further investigation.

The presence of wells in quadrant 1 may benefit from targeted operational strategies to enhance oil production while maintaining the low GOR. This might involve techniques such as artificial lift optimization, stimulation treatments, or reservoir pressure maintenance. The cluster may also guide the development of production enhancement strategies to address potential formation damage, near-wellbore issues, or reservoir depletion that may be causing the low production rates. By analyzing these wells, operators may gain insights into the reservoir characteristics and well dynamics that lead to low OR and low GOR, enabling more precise control over production optimization and helping to improve overall field performance.

Conversely, the cluster of data points in quadrant 3, which represents wells with high GOR and low OR, may signify a set of wells experiencing specific operational challenges. These wells, producing a lower volume of oil relative to the amount of gas, may be indicative of issues such as gas coning, high gas breakthrough, or reservoir compartmentalization, which can diminish oil production efficiency and increase operational costs.

The presence of wells in quadrant 3 may benefit from targeted operational strategies to manage or mitigate the high GOR while improving oil production. This might involve techniques such as gas re-injection, the use of downhole gas separators, or adjustments in the lift gas rates. This cluster may also guide the development of predictive maintenance strategies to address potential mechanical failures or reservoir management issues that may be causing the high gas production and low oil rates. By analyzing these wells, operators can gain insights into the reservoir characteristics and well dynamics that lead to high GOR and low OR, enabling more precise control over gas management and helping to optimize overall field performance.

Furthermore, the analysis of wells in both clusters can provide lessons for managing similar conditions in other fields or wells, enhancing the company's ability to handle complex reservoir behaviors effectively. This strategic focus not only helps in optimizing the current field's output but also in planning and executing operations in fields with similar geological characteristics or production challenges.

Figure 8C:
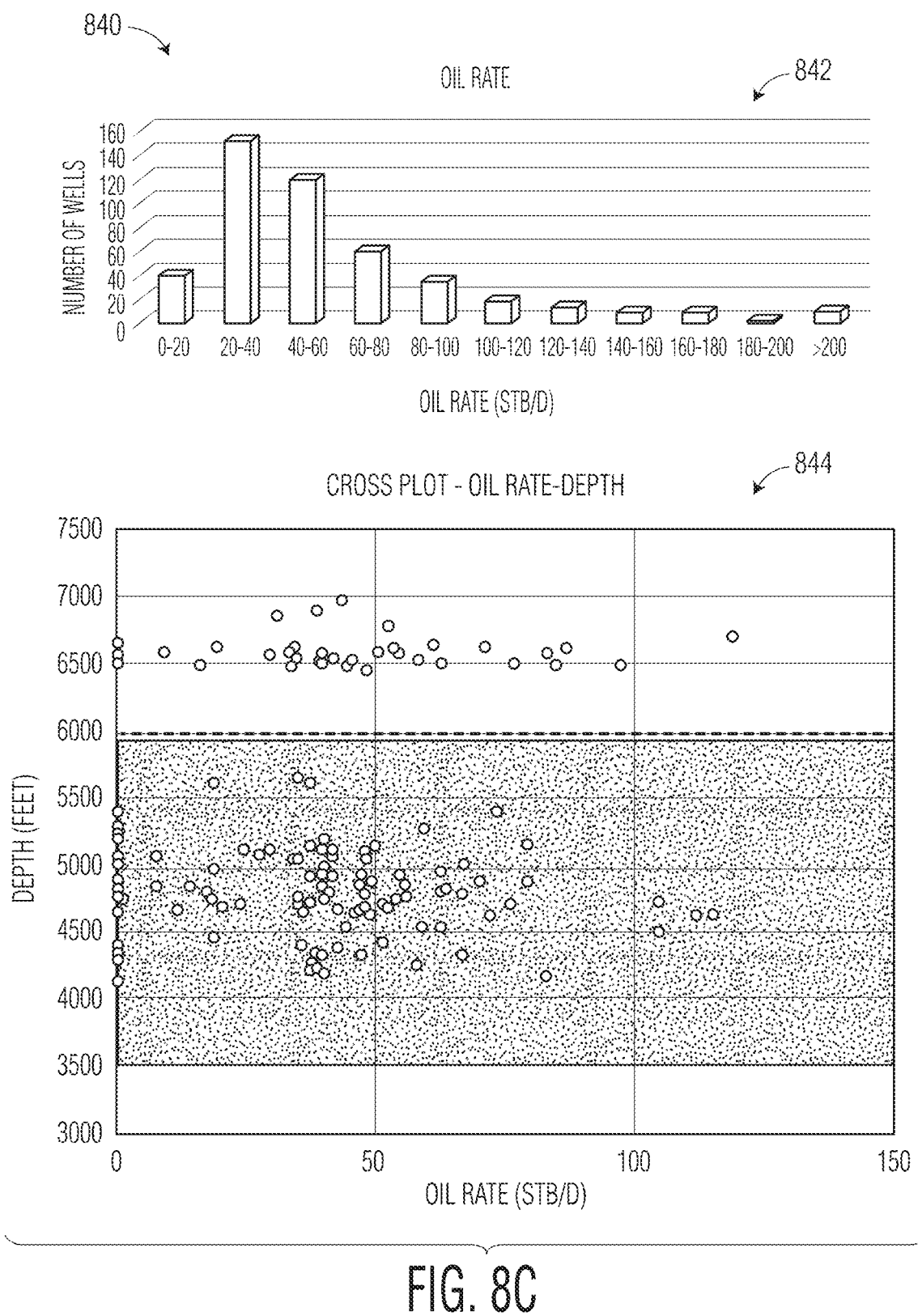
FIG. 8C depicts a graphical user interface displaying oil production data, according to aspects of the present disclosure.

Referring to FIG. 8C, a graphical user interface (GUI) 840 is depicted, which is configured to display oil production data. The GUI 840 comprises two main components: an oil rate chart 842 and a cross plot oil rate depth 844. The oil rate chart 842 is positioned at the top of the GUI 840 and displays a histogram of oil production rates in STB/D (Stock Tank Barrels per Day). The cross plot oil rate depth 844 is located below the oil rate chart 842 and shows the relationship between oil rate and well depth. The cross plot oil rate depth 844 uses blue dots to represent individual data points, with the x-axis showing oil rate in STB/D and the y-axis showing depth in feet. A highlighted rectangular area in the cross plot oil rate depth 844 indicates a specific range of interest for analysis.

In the cross plot oil rate depth 844, the cluster of data points below the dashed line at depth 6000 feet may represent a group of wells with shallow depth that exhibit similar oil production rates to the cluster of wells above the threshold for deeper wells. This observation may be significant for several reasons.

Firstly, it may indicate that these shallower wells are performing comparably to their deeper counterparts in terms of oil production, despite the general expectation that deeper wells often access larger reservoirs or higher-pressure zones. This unexpected performance may suggest the presence of highly productive shallow formations or the successful implementation of advanced production techniques in these shallower wells.

Secondly, the similarity in oil rates between shallow and deep wells may have implications for drilling and production strategies. The company may be able to achieve comparable production rates with shallower, potentially less expensive wells, which may significantly impact the economics of field development. This insight may lead to a reevaluation of drilling depth targets and may influence future well planning and resource allocation decisions.

Furthermore, the presence of high-producing shallow wells may provide information about the reservoir characteristics and fluid distribution within the field. It may indicate areas of the reservoir where oil has migrated to shallower depths or where natural fracture systems are enhancing production from shallower formations. This information may be beneficial for refining geological models and improving overall understanding of the field's structure and behavior.

In some cases, the performance of these shallow wells may also have implications for production optimization strategies. The company may investigate whether the techniques or technologies employed in these successful shallow wells may be applied to other parts of the field to enhance overall production efficiency. Additionally, the data from these wells may inform decisions about workover candidates or recompletion opportunities in existing deeper wells that are underperforming relative to their shallow counterparts.

In yet other aspects, the GUI 840 may be integrated with other systems or platforms used in oilfield operations. For instance, the GUI 840 may be connected to a SCADA system, a data storage system, or a network of sensors and devices installed at the oilfield. This integration allows the GUI 840 to receive real-time data, send commands or instructions, and synchronize with other systems for coordinated operation.

In some aspects, the integration of the GUI 840 with other systems may extend beyond simple data exchange and command transmission. For example, the GUI 840 may be designed to interface with advanced analytics platforms, allowing for real-time processing and visualization of complex data streams. This integration may enable the GUI 840 to display not only raw sensor data but also derived metrics, predictive analytics, and anomaly detection results. The system may utilize machine learning algorithms to continuously analyze incoming data, identifying patterns and trends that may not be immediately apparent to human operators.

Furthermore, the GUI 840 may be integrated with automated control systems, enabling a more dynamic and responsive approach to oilfield management. In this configuration, the GUI 840 may serve as both a monitoring interface and a control panel, allowing operators to not only view real-time data but also make immediate adjustments to operational parameters. For instance, if the system detects a sudden change in well performance, it may automatically suggest corrective actions through the GUI 840, which the operator can then implement with a single click. This level of integration may significantly reduce response times to changing field conditions, potentially improving overall production efficiency and reducing the risk of equipment failures or environmental incidents.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the presented example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A system for enhancing oilfield performance analysis and optimization, comprising:
   a controller configured to collect real-time Gas-Oil Ratio (GOR) and Water Cut (WC) data from oilfield sensors;
   a processing server comprising a physics-based model configured to simulate a vertical pressure profile based on the collected GOR and WC data, and a machine learning model configured to:
   analyze outputs from the physics-based model based on the simulated vertical pressure profile and historical data from a plurality of wells, the analysis determining performance characteristics of each of the wells, classify the wells into performance categories based on the performance characteristics of the analysis, establish baseline metrics for evaluating well productivity based on the analysis and classification, generate a recommendation for well operations based on the analysis, classification and baseline metrics, the recommendation comprising separate recommendations for wells in each of the performance categories; and a user interface configured to display the recommendation, wherein the controller is further configured to autonomously control the well operations in response to the recommendation by implementing corrective operational changes of the well addressing a deviation of the well productivity from the baseline metrics.

2. The system of claim 1, wherein the physics-based model is configured to simulate the vertical pressure profile by applying fluid dynamics and thermodynamics principles to the collected GOR and WC data.

3. The system of claim 1, wherein the machine learning model comprises supervised learning algorithms for performance prediction and unsupervised learning algorithms for well classification and pattern recognition.

4. The system of claim 1, wherein the processing server is configured to detect anomalies in real-time GOR and WC data and generate alerts when deviations from expected behavior occur.

5. The system of claim 4, wherein the processing server is configured to generate different levels of alarms based on a severity of detected anomalies.

6. The system of claim 1, wherein the machine learning model is configured to generate the recommendation for gas allocation optimization based on predicted post-lifting production for each well.

7. The system of claim 1, wherein the processing server is configured to update the physics-based model and the machine learning model with new performance data collected after implementing the recommendation for the well operations.

8. The system of claim 7, wherein the processing server is configured to refine predictions and optimization strategies based on the updated physics-based model and the updated machine learning model.

9. The system of claim 1, wherein the user interface is configured to display data visualization dashboards comprising histograms, scatter plots, and statistical summaries of well performance metrics.

10. The system of claim 9, wherein the data visualization dashboards include cross-plots of oil rate versus gas-oil ratio and oil rate versus depth.

11. A method for enhancing oilfield performance analysis and optimization, comprising:

collecting, by a controller, real-time Gas-Oil Ratio (GOR) and Water Cut (WC) data from oilfield sensors;

simulating, by a processing server, a vertical pressure profile based on the collected GOR and WC data using a physics-based model;

analyzing, by the processing server, outputs from the physics-based model based on the simulated vertical pressure profile and historical data using a machine learning model from a plurality of wells, the analysis determining performance characteristics of each of the wells;

classifying, by the processing server, the wells into performance categories based on the performance characteristics of the analysis;

establishing, by the processing server, baseline metrics for evaluating reservoir productivity based on the analysis and classification;

generating, by the processing server, a recommendation for well operations based on the analysis, classification and baseline metrics, the recommendation comprising separate recommendations for wells in each of the performance categories;

displaying the recommendation on a user interface; and autonomously controlling, by the controller, the well operations in response to the recommendation by implementing corrective operational changes of the well addressing a deviation of the well productivity from the baseline metrics.

12. The method of claim 11, wherein simulating the vertical pressure profile comprises applying fluid dynamics and thermodynamics principles to the collected GOR and WC data.

13. The method of claim 11, wherein the machine learning model comprises supervised learning algorithms for performance prediction and unsupervised learning algorithms for well classification and pattern recognition.

14. The method of claim 11, comprising detecting anomalies in real-time GOR and WC data and generating alerts when deviations from expected behavior occur.

15. The method of claim 14, comprising generating different levels of alarms based on a severity of detected anomalies.

16. The method of claim 11, comprising generating the recommendation for gas allocation optimization based on predicted post-lifting production for each well.

17. The method of claim 11, comprising updating the physics-based model and the machine learning model with new performance data collected after implementing the recommendation for the well operations.

18. The method of claim 17, comprising refining predictions and optimization strategies based on the updated physics-based model and the updated machine learning model.

19. The method of claim 11, comprising displaying data visualization dashboards comprising histograms, scatter plots, and statistical summaries of well performance metrics.

20. The method of claim 19, wherein the data visualization dashboards include cross-plots of oil rate versus gas-oil ratio and oil rate versus depth.

* * * * *